United States Patent [19]

Umemura

[11] Patent Number: 4,736,448
[45] Date of Patent: Apr. 5, 1988

[54] SPATIAL FILTER

[75] Inventor: Yoshiyuki Umemura, Tochigi, Japan

[73] Assignee: Kabushiki Kaisha Toshiba, Kawasaki, Japan

[21] Appl. No.: 717,724

[22] Filed: Mar. 29, 1985

[30] Foreign Application Priority Data

Mar. 31, 1984 [JP] Japan ................................. 59-63977
Mar. 31, 1984 [JP] Japan ................................. 59-63978
Apr. 14, 1984 [JP] Japan ................................. 59-75596

[51] Int. Cl.$^4$ .............................................. G06K 9/40
[52] U.S. Cl. ...................................... 382/54; 364/724
[58] Field of Search ................ 382/41, 31, 54, 27; 364/724, 862, 572; 250/550, 162.12

[56] References Cited

U.S. PATENT DOCUMENTS

| 3,563,634 | 2/1971 | Parks et al. | 382/31 |
| 3,849,760 | 11/1974 | Endou et al. | 382/41 |
| 3,993,976 | 11/1976 | Ginsburg | 382/41 |
| 4,328,426 | 5/1982 | D'Ortenzio | 382/41 |
| 4,489,390 | 12/1984 | Parenti et al. | 364/724 |

Primary Examiner—Leo H. Boudreau
Attorney, Agent, or Firm—Finnegan, Henderson, Farabow, Garrett & Dunner

[57] ABSTRACT

A spatial filter has a plurality of uniformly weighting spatial filters for defining as pixel data of a given pixel a value corresponding to a sum of pixel data in a predetermined square area near the given pixel. The characteristics of these uniformly weighting spatial filters are linearly coupled to obtain substantially circular filter characteristics.

3 Claims, 22 Drawing Sheets

F I G. 13A
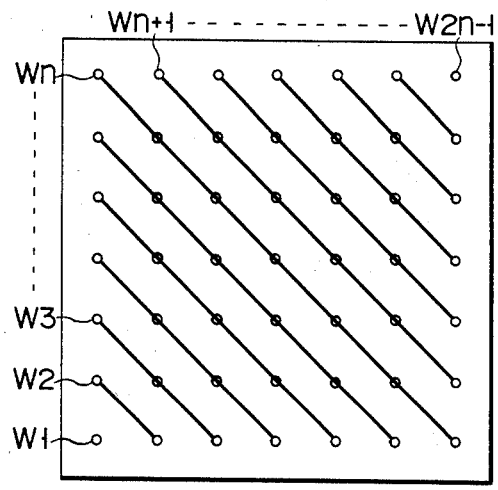
F I G. 13B
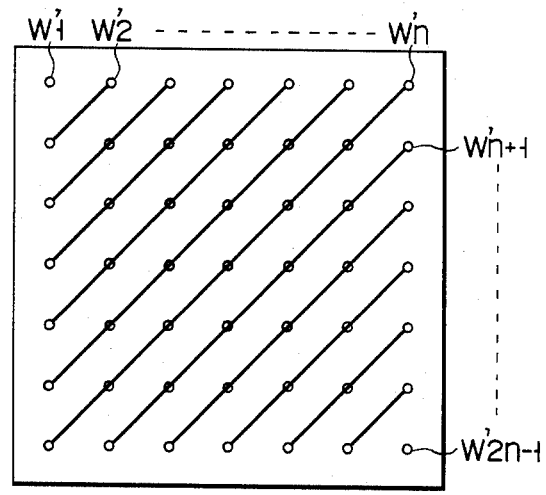
F I G. 14
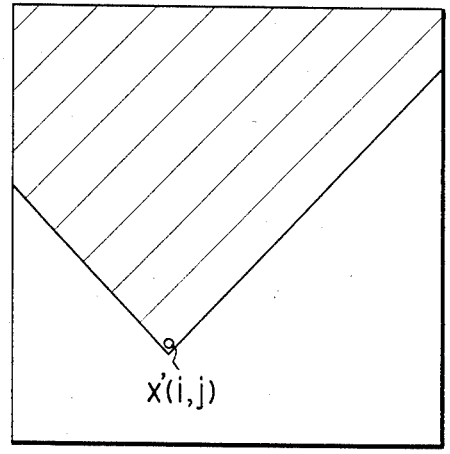

F I G. 15A
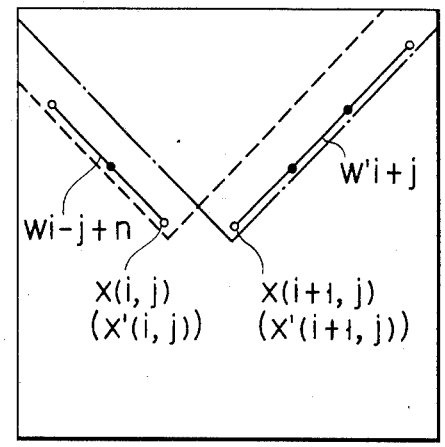
F I G. 15B
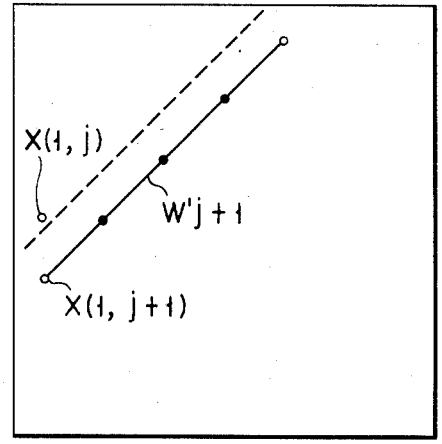
F I G. 16
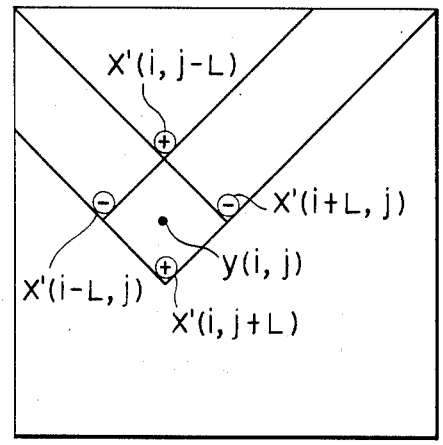

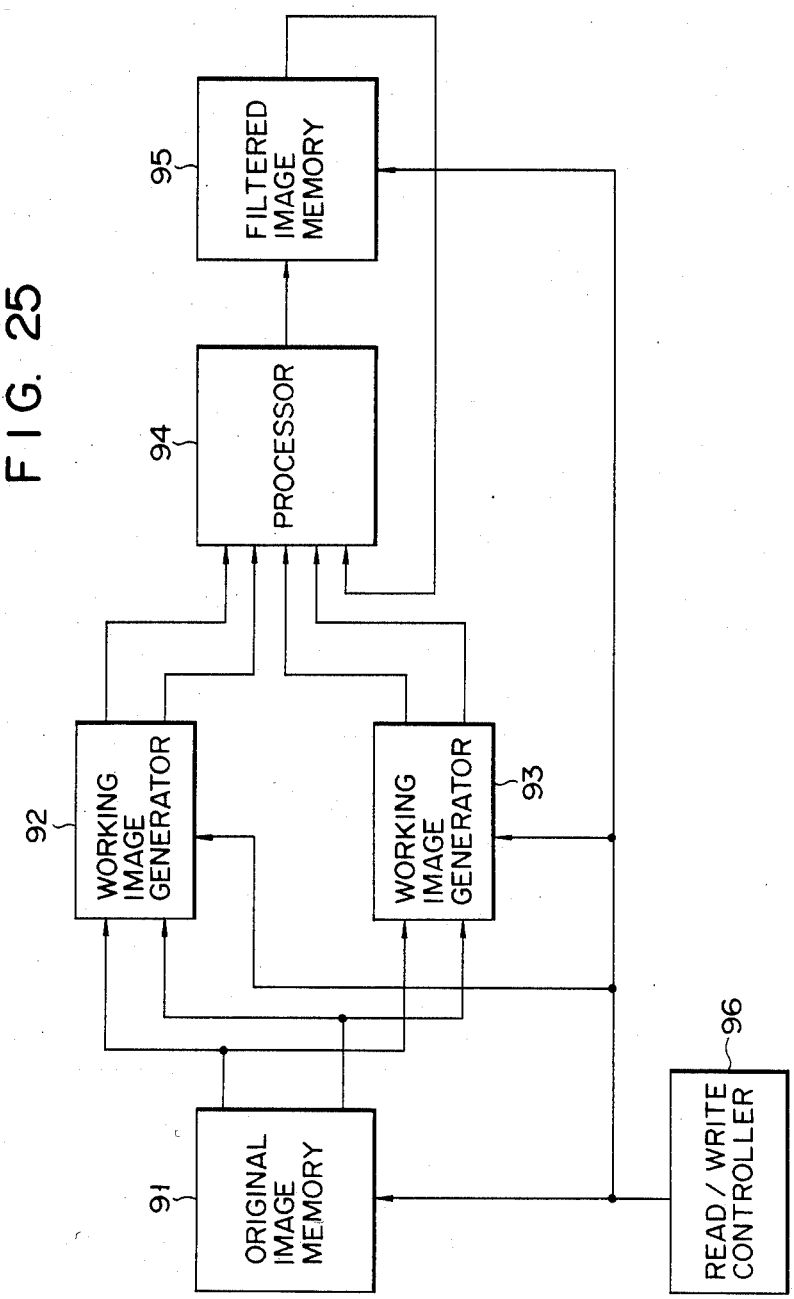

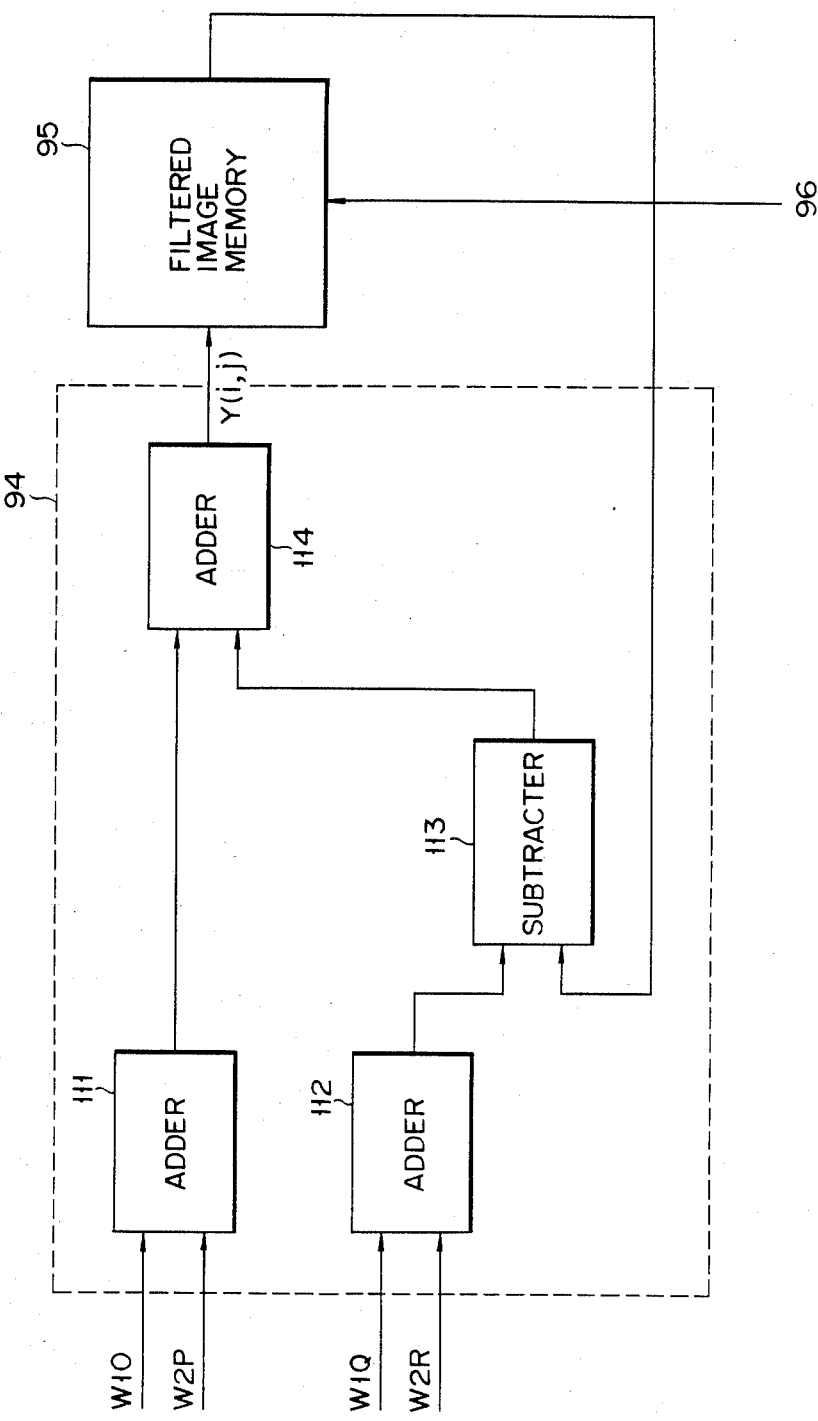
F I G. 27

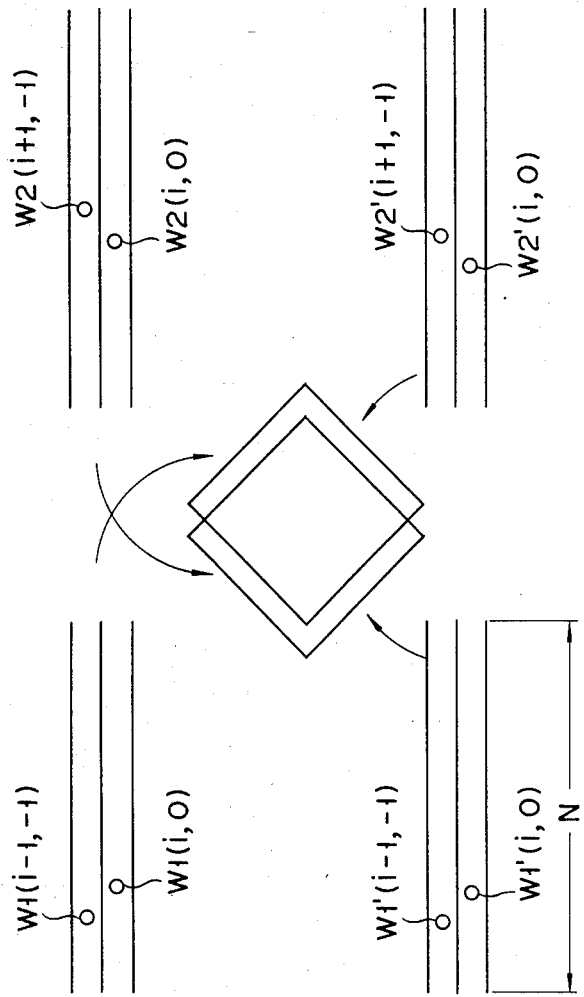

SPATIAL FILTER

BACKGROUND OF THE INVENTION

The present invention relates to a spatial filter used for smoothing or emphasizing an image represented by image data and, more particularly, to a spatial filter for improving spatial frequency response and increasing a processing rate.

Spatial filtering is known as one of the basic image processing techniques. Spatial filters include a low-pass filter, a high-pass filter and a band-pass filter in the same manner as in filters for a normal time frequency range. The low-pass filter is used, for example, as a smoothing filter for removing a noise component of the image. The high-pass filter is often used as an edge-emphasizing filter for emphasizing a high-frequency component to emphasize an edge portion of the image so as to allow an operator easy visual recognition. The band-pass filter is used for emphasizing a spatial frequency range corresponding to significant data.

By using a low-pass filter, i.e., the smoothing filter, another spatial filter such as a high-pass filter or a band-pass filter can be obtained.

As shown in FIG. 1A, when original image data A is filtered through a smoothing filter 1, and the resultant smoothed image data B is subtracted by a subtracter 2 from the original image data A, a high-pass filter 3 having the characteristics shown in FIG. 1B can be obtained. In addition, when the filters 3 and 1 respectively having cut-off frequencies a and b (a<b) are coupled in cascade, as shown in FIG. 2A, a band-pass filter having the characteristics shown in FIG. 2B can be obtained.

Conventional methods for providing a smoothing filter include FFT (fast Fourier transform), convolution using a normal coefficient impulse response, repetition by a 3×3 filter, and a uniformly weighting filter algorithm.

The conventional uniformly weighting filter algorithm is described in "High-Speed Algorithm in Computed Image Processing" by Toriwaki, Yokoi and Fukumura, JYOUHOUSYORI, Vol. 17, No. 3, pp. 215-221 (1976). This filtering method can achieve the fastest image processing among the above-described conventional methods.

A "uniformly weighting filter algorithm II" in the above reference will be described in detail.

An impulse response of a square filter is given as a constant below:

$$a_{(i,j)} = 1 \qquad (1)$$

$$i = -K/2, (K/2) + 1$$

$$j = -L/2, (L/2) + 1$$

where K and L are respectively support sizes.

In the first step, a working image $x'_{(i,j)}$ shown in FIG. 3A is prepared:

$$x'_{(i,j)} = \sum_{l=1}^{i} \sum_{m=1}^{j} x_{(l,m)} \qquad (2)$$

where $x_{(l,m)}$ is the original image. The working image $x'_{(i,j)}$ represents a sum of gradations of the original image in a square region (i.e., a hatched region) having vertices (1,1), (i,1), (1,j) and (i,j). The number of operations for deriving the working image $x'_{(i,j)}$ is twice for each pixel. The addition will be described with reference to FIG. 3B. For example, the addition for the working image is performed following the order corresponding to raster scanning of a television image or the like from the left end to the right end of the first line (j=1), the left end to the right end of the second line (j=2), . . . . A working register sequentially stores sums of $x_{(1,j)}$, $x_{(2,j)}$, . . . and $x_{(i-1,j)}$. When the content of the working register is defined as W, the working image $x'_{(i,j)}$ is obtained by the two operations below:

$$W \leftarrow W + x_{(i,j)} \qquad (3)$$

$$x'_{(i,j)} \leftarrow W + x'_{(i,j-1)} \qquad (4)$$

In the second step, a smoothed image $y_{(i,j)}$ is obtained by using the working image $x'_{(i,j)}$ derived in the first step:

$$y_{(i,j)} = \sum_{m=-L/2}^{L/2} \sum_{l=-K/2}^{K/2} x_{(i+l,j+m)} \qquad (5)$$

The smoothed image $y_{(i,j)}$ is derived from the following operation (see FIG. 3C):

$$y_{(i-[K/2],j-[L/2])} = x'_{(i,j)} - x'_{(i,j-L)} - x'_{(i-K,j)} - x'_{(i-K,j-L)} \qquad (6)$$

More particularly, referring to FIG. 3C, if a sum of gradations in the hatched region is added, the smoothed image is obtained. In this case, the operation rate is high irrespective of the support size.

The conventional smoothing filter including a filter based on the uniformly weighting filter algorithm cannot obtain sufficient characteristics under the condition where strict spatial frequency response is required. This is because a considerably large ripple or gain variation RP occurs near the cut-off frequency as indicated by an example (i.e., the support size=35) of the frequency characteristics in FIG. 4. The ripple component causes an artifact in the processed image. The artifact degrades the image quality of the resultant image, poor appearance, and a visual recognition error. For example, the artifact in the image obtained by a medical diagnostic apparatus causes a diagnostic error, resulting in a crucial problem.

When a direct filtering algorithm is used instead of using a high-speed processing algorithm, a ripple-free filter can be obtained. In this case, however, the processing rate is greatly decreased.

The directivity (in the Fourier space) of the frequency characteristics is one of the important factors for determining filter performance. This directivity indicates a change in frequency characteristics which is caused by the direction of the Fourier space. In other words, directivity indicates what changes occur in the frequency characteristics in accordance with the ω1, ω2 and diagonal (i.e., an intermediate direction between the ω1 and ω2 directions) directions. For example, as shown in FIGS. 5A and 5B (in the case of a support size=19×19), the frequency characteristics vary in accordance with changes in directions; the frequency characteristics along the ω1 and ω2 directions are poor. FIG. 5B shows only a portion where ω2 is large with respect to the line I—I of FIG. 5A.

SUMMARY OF THE INVENTION

It is an object of the present invention to provide a spatial filter which has good frequency characteristics, good directivity thereof and provides high-speed filtering.

The spatial filter according to the present invention has a rectangular impulse response. A plurality of uniformly weighting spatial filters are prepared such that a value as a sum of the pixel values in the rectangular area near a given pixel is defined as a pixel value of the given pixel. These uniformly weighting spatial filters are combined to provide substantially circular filter characteristics.

A given spatial filter according to the present invention has a plurality of parallel square-shaped impulse response filters each having a square-shaped impulse response surrounded by two pairs of sides, which pairs are parallel to transverse and vertical directions of the original image. These square-shaped impulse response filters add the pixel values of the square area near the pixel. The spatial filter thus comprises: a plurality of operating means for adding the pixel values of the square area surrounded by the pairs of sides which are parallel to the transverse and vertical directions of the image; and a coupling means for coupling outputs from the operating means. The square regions whose pixel values are added by the plurality of operating means substantially constitute a circle.

Another spatial filter according to the present invention comprises: a cascaded couple of a square-shaped impulse response filter and a diamond-shaped impulse response filter. The square-shaped impulse response filter has a square-shaped impulse response surrounded by two pairs of sides, which pairs are parallel to the transverse and vertical directions of the image. This square-shaped impulse response filter adds pixel values of a square area near a pixel. The diamond-shaped impulse response filter has a diamond-shaped impulse response surrounded by two pairs of sides, which pairs form an angle of 45 degrees with respect to the transverse and vertical directions of the image, respectively. The diamond-shaped impulse response filter adds the pixel values of a diamond-shaped area near a pixel.

BRIEF DESCRIPTION OF THE DRAWINGS

FIGS. 9A and 9B to 12A and 12B are respectively representations for explaining the operation and effect of the spatial filter shown in FIG. 6;

FIGS. 13A and 13B to 17 are representations for explaining the principle of operation of a spatial filter according to a second embodiment of the present invention;

FIGS. 22 to 24A and 24B are respectively representations for explaining the principle of operation of a spatial filter according to a third embodiment of the present invention;

FIG. 25 is a block diagram showing the configuration of the main part of the spatial filter according to the third embodiment of the present invention;

FIGS. 26 and 27 are block diagrams showing the detailed arrangements of parts of the filter shown in FIG. 25, respectively;

FIGS. 29A, 29B and 30 are representations showing modifications of the third embodiment, respectively.

DETAILED DESCRIPTION OF THE PREFERRED EMBODIMENTS

Figure 6:
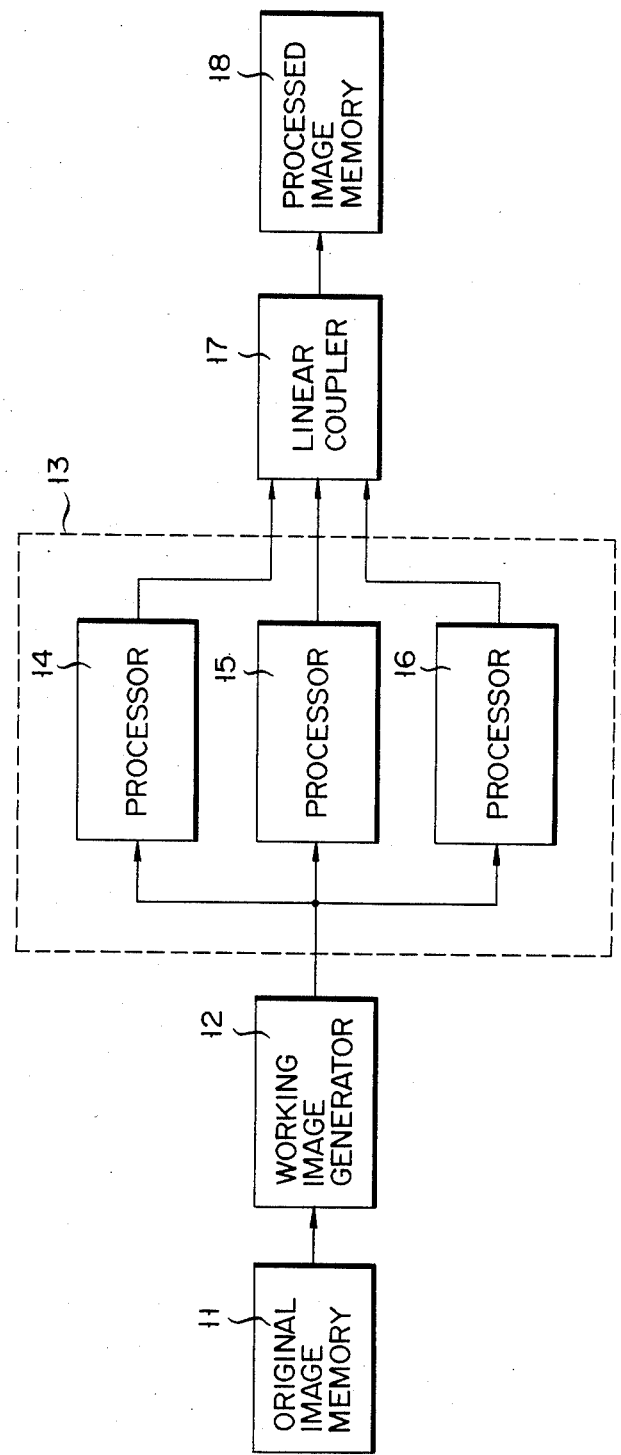
FIG. 6 is a block diagram of a spatial filter according to a first embodiment of the present invention.

FIG. 6 is a block diagram of a spatial filter according to a first embodiment of the present invention. According to this embodiment, square-shaped impulse responses are superposed in a parallel manner to obtain a response of substantially a circular shape. During superposition, the frequency characteristics are properly weighted to improve the response.

Referring to FIG. 6, three impulse responses are superposed for illustrative convenience.

An original image (data) to be processed is stored in an original image memory 11. A working image generator 12 generates a working image $x'_{(i,j)}$ (to be described later) derived from an original image $x_{(i,j)}$ read out from the memory 11. The image $x'_{(i,j)}$ is supplied to a filtering processing means 13 and is subjected to filtering in accordance with three square-shaped impulse responses. The processed results are then properly weighted. The filtering processing means 13 comprises three processors 14, 15 and 16 for processing the image data using as parameters size and positions (addresses) of a square of the basic impulse responses. The processors 14, 15 and 16 filter the image $x'_{(i,j)}$ in accordance with the respective impulse responses. The processed results are then weighted independently of each other. Outputs from the processors 14, 15 and 16 are supplied to a linear coupler 17. The coupler 17 performs additive superposition, i.e., linear coupling. The outputs from the processors 14, 15 and 16 are linearly coupled. The filtered result from the coupler 17 is obtained as a processed image in accordance with the impulse response of a substantially circular shape on the x-y plane and/or a stepwise shape on the i−h(i) plane. The processed image from the coupler 17 is stored in a processed image memory 18.

Figure 7:
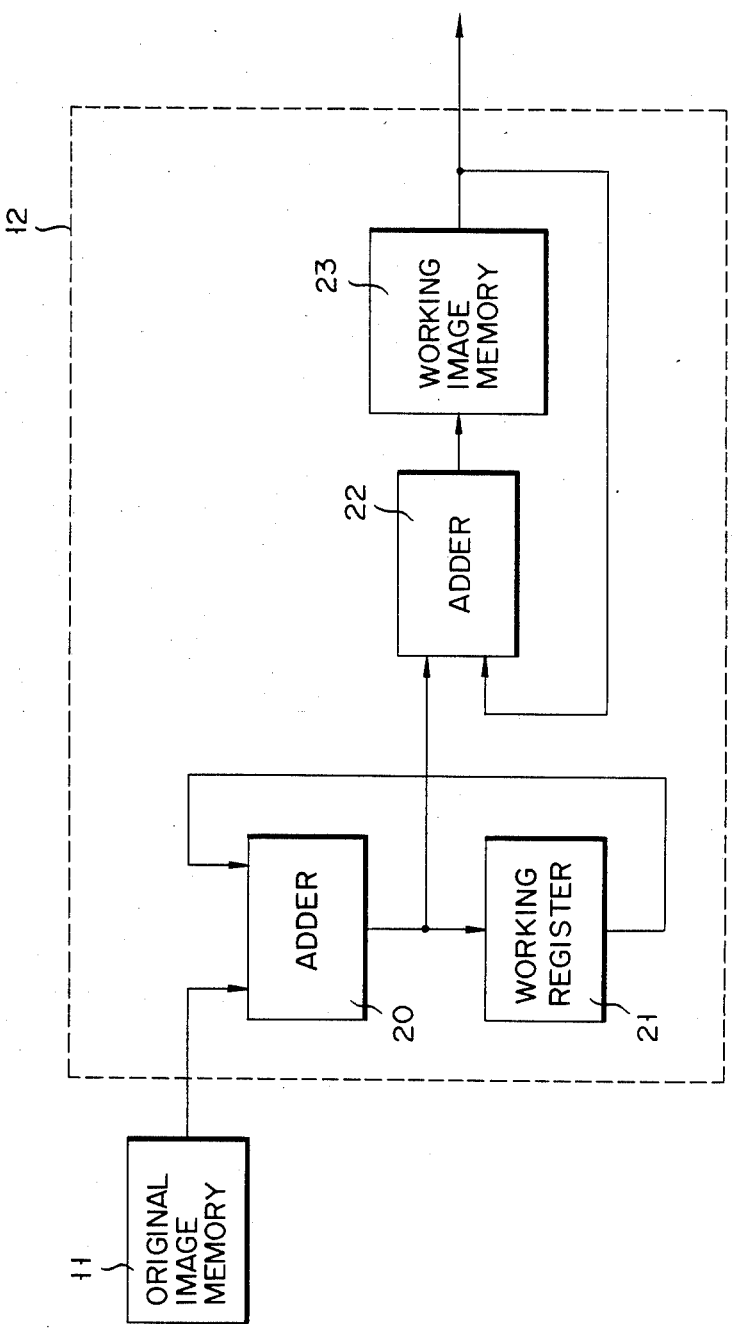
FIGS. 7 and 8 are block diagrams showing the detailed arrangements of parts of the filter of FIG. 6, respectively.

The detailed arrangement of the working image generator 12 will be described with reference to FIG. 7.

The generator 12 comprises adders 20 and 22, a working register 21 and a working image memory 23. The adder 20 adds a value W read out from the register 21 to the original image (image data) $x_{(i,j)}$ read out from the memory 11, thereby sequentially updating the content W of the register 21. The register 21 thus stores an output (i.e., the sequentially updated value W) from the adder 20. The adder 22 adds the output x'$_{(i,j)}$ read out from the memory 23 to the output (i.e., the updated W) from the adder 20. A sum output, i.e., the image x'$_{(i,j)}$, from the adder 22 is stored in the memory 23.

Figure 8:
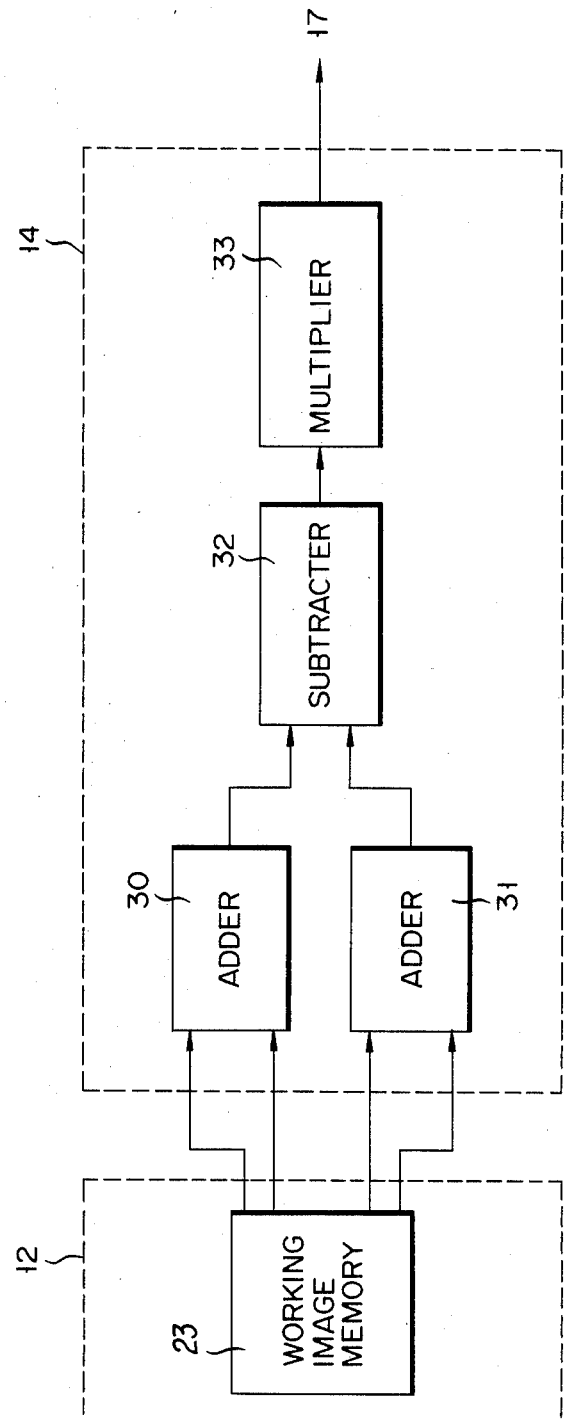

The detailed arrangement of the filtering processing means 13 will be described. FIG. 8 shows the detailed arrangement of one of the processors 14, 15 and 16 (e.g., the processor 14) constituting the filtering processing means 13. The processors 15 and 16 have the same arrangement as that of the processor 14.

As described above, the working image generated from the generator 12 is stored in the memory 23. The processor 14 comprises adders 30 and 31, a subtracter 32 and a multiplier 33. The adder 30 adds pixel data P1 and P2 among pixel data P1, P2, P3 and P4 read out from corresponding addresses of the memory 23. The adder 31 adds the pixel data P3 and P4. The subtracter 32 calculates a difference between the outputs from the adders 30 and 31. The multiplier 33 multiplies the output from the subtracter 32 with a predetermined value so as to weight the output from the processor 14. The filtered results of the processors 14, 15 and 16 are weighted by the multiplier 33 and other multipliers corresponding to the processors 15 and 16. The outputs from the multiplier 33 and the multipliers corresponding to the processors 15 and 16 are independently supplied to the coupler 17.

The operation of the spatial filter having the above-mentioned configuration will be described below.

The original image (data) read out from the memory 11 is supplied to the generator 12. The generator 12 generates the image x'$_{(i,j)}$ in accordance with the original image. As described with reference to FIGS. 3A and 3B, the image x'$_{(i,j)}$ is calculated by equation (2). In other words, the adder 20 and the register 21 operate in relation to each other to update the value W in the register 21 in accordance with equation (3). The adder 22 and the memory 23 operate in relation to each other by using the updated value W, thereby obtaining the image x'$_{(i,j)}$ in accordance with equation (4).

The pixel data P1, P2, P3 and P4 of the image x'$_{(i,j)}$ stored in the memory 12 are read out from different addresses and are used for processing by the processors 14 to 16.

The pixel data P1 to P4 are given as follows:

$$P1 = x'_{(i+M1+[K1/2], j+N1+[L1/2])} \quad (7)$$

$$P2 = x'_{(i+M1-[K1/2], j+N1-[L1/2])} \quad (8)$$

$$P3 = x'_{(i+M1-[K1/2], j+N1+[L1/2])} \quad (9)$$

$$P4 = x'_{(i+M1+[K1/2], j+N1-[L1/2])} \quad (10)$$

where K1 and L1 are parameters for determining the level of the impulse response, and M1 and N1 are parameters for spatially shifting the impulse response.

When the parameters K1, L1, M1 and N1 are updated, the level and position of the basic square impulse response of the processor 14 (15 or 16) can be changed.

The pixel data P1 and P2 and the pixel data P3 and P4 are respectively added by the adders 30 and 31. The outputs from the adders 30 and 31 are subtracted by the subtracter 32 from each other. The output y1$_{(i,j)}$ from the subtracter 32 is given as follows:

$$y1_{(i,j)} = x'_{(i+M1+[K1/2], j+N1+[L1/2])} + \quad (11)$$

$$x'_{(i+M1-[K1/2], j+N1-[L1/2])} - x'_{(i+M1-[K1/2], j+N1+[L1/2])} -$$

$$x'_{(i+M1+[K1/2], j+N1-[L1/2])}$$

The above equation is generalized as follows:

$$y1_{(i,j)} = x'_{(A1,B1)} + x'_{(C1,D1)} - x'_{(C1,B1)} - x'_{(A1,D1)}$$

Similarly, an output y2$_{(i,j)}$ from a subtracter (not shown) in the processor 15 is given as follows:

$$y2_{(i,j)} = x'_{(i+M2+[K2/2], j+N2+[L2/2])} + \quad (12)$$

$$x'_{(i+M2-[K2/2], j+N2-[L2/2])} -$$

$$x'_{(i+M2-[K2/2], j+N2+[L2/2])} -$$

$$x'_{(i+M2+[K2/2], j+N2-[L2/2])}$$

The above equation is generalized as follows:

$$y2_{(i,j)} = x'_{(A2,B2)} + x'_{(C2,D2)} - x'_{(C2,B2)} - x'_{(A2,D2)}$$

Furthermore, an output y3$_{(i,j)}$ from a subtracter (not shown) in the processor 15 is given as follows:

$$y3_{(i,j)} = x'_{(i+M3+[K3/2], j+N3+[L3/2])} + \quad (13)$$

$$x'_{(i+M3-[K3/2], j+N3-[L3/2])} -$$

$$x'_{(i+M3-[K3/2], j+N3+[L3/2])} -$$

$$x'_{(i+M3+[K3/2], j+N3-[L3/2])}$$

The above equation is generalized as follows:

$$y3_{(i,j)} = x'_{(A3,B3)} + x'_{(C3,D3)} - x'_{(C3,B3)} - x'_{(A3,D3)}$$

The output from the subtracter 32 in the processor 14 is multiplied by a1 by the multiplier 33 therein. A multiplied result is supplied to the coupler 17. Similarly, the outputs from the subtracters in the processors 15 and 16 are multiplied by a2 and a3 by the corresponding multipliers, respectively. The products are supplied to the coupler 17. The coupler 17 adds the outputs from the multipliers in the processors 14, 15 and 16. The coupled result is stored in the memory 18. Therefore, the memory 18 stores the following result:

$$y_{(i,j)} = a1 y1_{(i,j)} + a2 y2_{(i,j)} + a3 y3_{(i,j)} \quad (14)$$

Equation (14) represents that the basic responses of the processors 14, 15 and 16 are linearly coupled by the coupler 17. When the parameters K1, L1, M1 and N1 in equations (7) to (10) are preset in each of the processors 14, 15 and 16, the shape of the impulse response on the i—h(i) plane or x-y plane can be arbitrarily determined.

The basic impulse response need not be shifted (translated) on the i—h(i) plane. In this case, the parameters M1 and L1 in equations (7) and (10) are preset to be zero.

Figure 4:
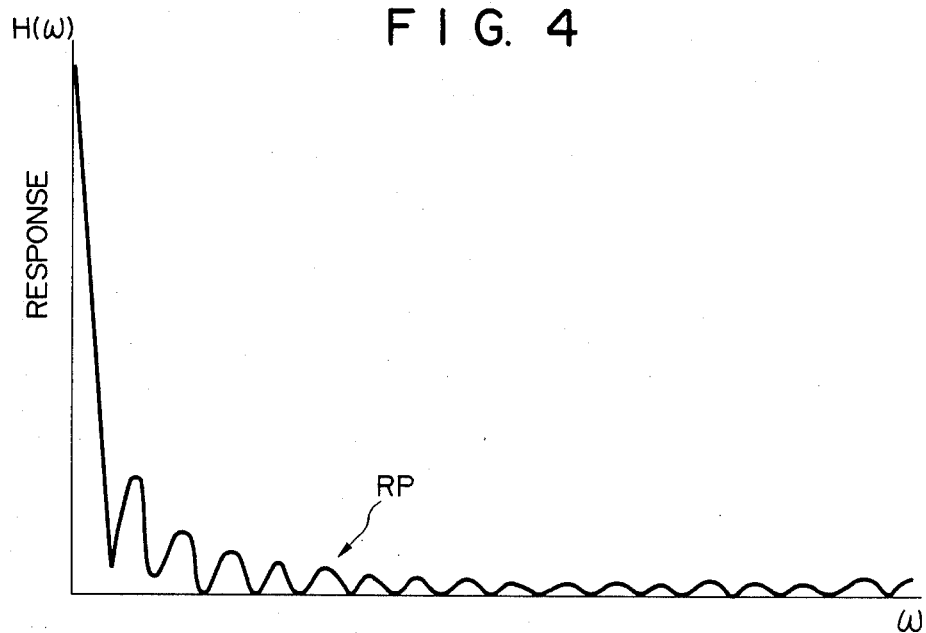
FIG. 4 is a graph showing an example of uniformly weighting filter frequency characteristics.
Figure 9A:
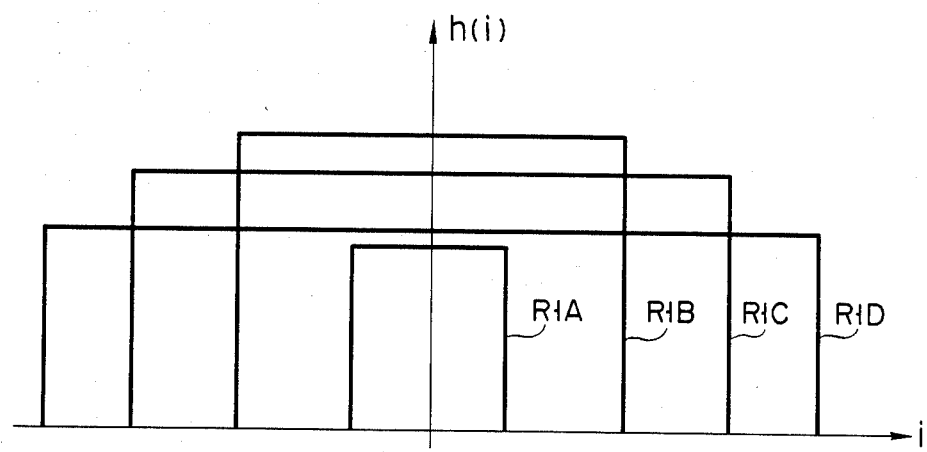
Figure 9B:
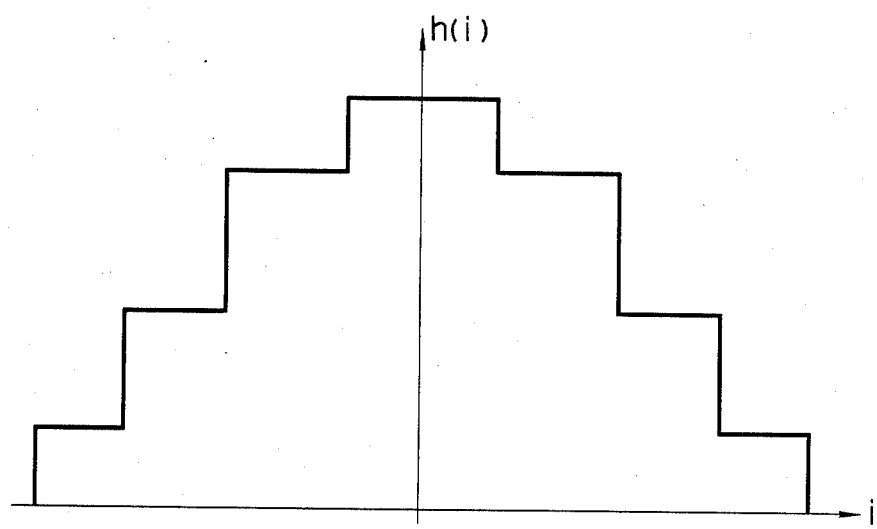
Figure 10:
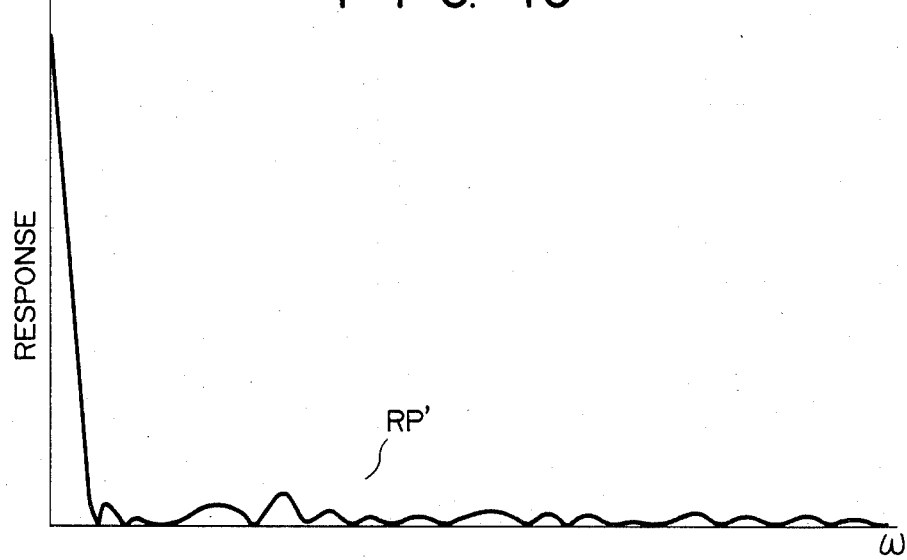

The basic impulse responses R1A, R1B, R1C and R1D (four processors constitute the filtering processing means 13 of FIG. 6 in this case) shown in FIG. 9A are independently weighted and linearly coupled, and a stepwise impulse response shown in FIG. 9B is obtained. The simulation result of the frequency characteristics in this case is illustrated in FIG. 10. When the response in FIG. 10 is compared with that in FIG. 4, the ripple RP' of the frequency characteristics in FIG. 10 is decreased to about ¼ as compared with the case of the uniformly weighting filter of FIG. 4.

When the number of times of linear coupling is defined as m, the number of additions/subtractions is 4m+1 and the number of multiplications is m. In the above description, since m=4 is given, the number of additions/subtractions is 17, and the number of multiplications is 4. As compared with conventional uniformly weighting filtering (the method of directly adding the pixel data for filtering without using a high-speed algorithm), high-speed filtering can be performed in this embodiment.

Figure 5A:
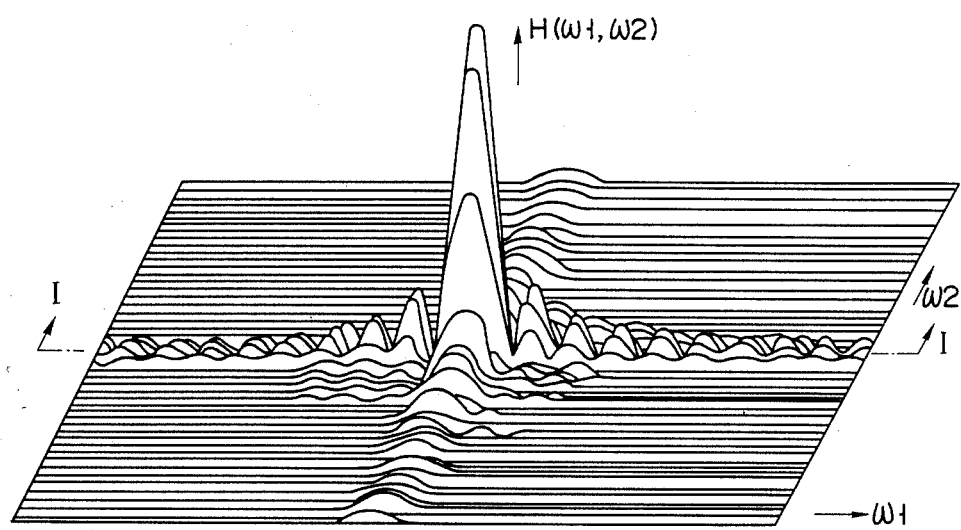
FIGS. 5A and 5B are respectively illustrations showing directivity of frequency characteristics of the conventional uniformly weighting filter.
Figure 5B:
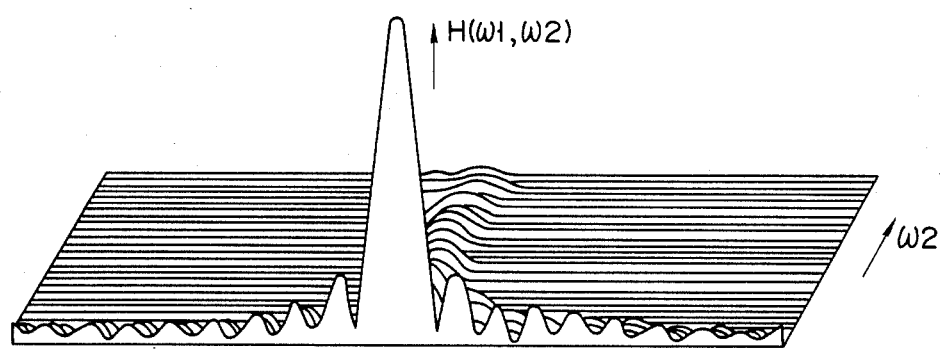
Figure 11:
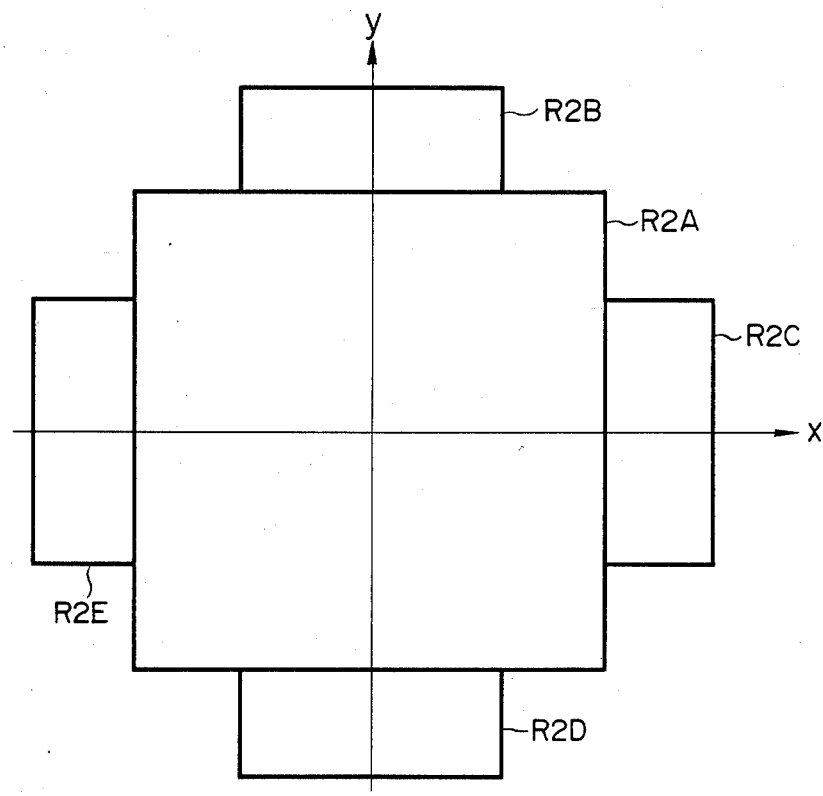
Figure 12A:
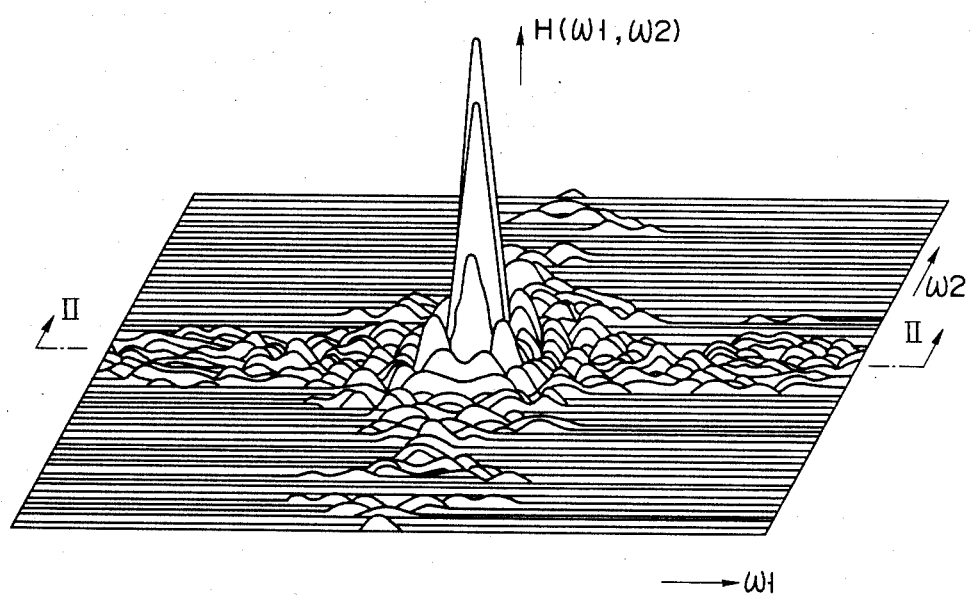
Figure 12B:
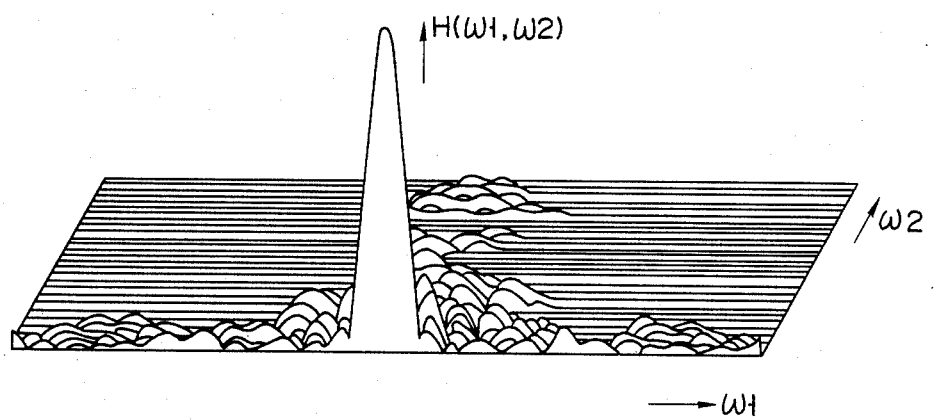

As shown in FIG. 11, basic impulse responses R2A, R2B, R2C, R2D and R2E are linearly coupled so as to constitute a circular shape on the x-y plane (which is an important feature of the present invention). The simulation results of directivity of the frequency characteristics in this case are illustrated in FIGS. 12A and 12B. FIG. 12A shows only a portion where ω2 is increased with respect to the line II—II of FIG. 12A. The directivity of the frequency characteristics in FIGS. 12A and 12B is better than that in FIGS. 5A and 5B.

In this case, the number of additions/subtractions is 4m+1. Since m=5 is given, the total number of additions/subtractions is 21.

Since filtering is performed on the basis of the working image generated by the working image generator, high-speed filtering can be performed. In addition, since filtering is performed in accordance with the square impulse response in each processor, and the outputs from the respective processors are linearly coupled, a filtered result by the impulse response of a stepwise shape on the i—h(i) plane or of a substantially circular shape on the x-y plane can be obtained. High-speed filtering with good frequency characteristics can be achieved.

In the above embodiment, the ripple and/or directivity of the frequency characteristics can be improved by increasing the number of basic impulse responses to be linearly coupled.

A spatial filter according to a second embodiment of the present invention will be described hereinafter. Although the same mathematical notations as in the first embodiment are used in the second embodiment, these do not always have the same meaning as in the first embodiment.

The principle of the second embodiment will first be described.

Assume that an image size is n×n and that two sets of working registers W ($W_1$ to $W_{2n-1}$) and W' ($W'_1$ to $W'_{2n-1}$) are prepared. The registers W and W' store one-dimensional pixel sums along lines which are at angles of 45 degrees with respect to the original image frame and are shifted by 90 degrees from each other.

In the first step, the image $x'_{(i,j)}$ is prepared such that the image data (gradation values of the respective pixels) of the original image $x_{(i,j)}$ within the hatched area in FIG. 14 are added. The working image can be calculated by sequential processing (to be described later) at high speed.

The sequential processing will be described with reference to FIGS. 15A and 15B to generate the image $x'_{(i,j)}$.

Assume that a sum $x'_{(i,j)}$ of the image data in the area illustrated by the dotted line in FIG. 15A is already obtained, that the register $W_{i-j+n}$ stores a sum up to the value of the pixel immediately preceding the pixel data $x_{(i,j)}$, i.e., $x_{(i-1,j-1)}$ and that the register $W_{i+j}$ stores a sum up to the value of the pixel immediately preceding the pixel data $x_{(i+1,j)}$, i.e., $x_{(i+1,j-1)}$. The sum $x'_{(i+1,j)}$ (of the image data within the area given by the alternate long and short dashed line in FIG. 8A) is calculated.

The contents of the registers $W_{i-j+n}$ and $W'_{i+j}$ are updated by relations below:

$$W_{i-j+n} \leftarrow W_{i-j+n} + X_{(i,j)} \qquad (21)$$

$$W'_{i+j} \leftarrow W'_{i+j} + X_{(i+1,j)} \qquad (22)$$

The data $x'_{(i+1,j)}$ is obtained as follows:

$$x'_{(i+1,j)} \leftarrow x'_{(i,j)} - W_{i-j+n} + W'_{i+j} \qquad (23)$$

The parameter i is subsequently increased to scan the image in the transverse direction. When one-line calculation is completed, the sums up to the jth line are stored in each of the registers W and W'.

The operation of the image $x'_{(1,j+1)}$ for the next vertical line, i.e., the (j+1)th line will be described with reference to FIG. 15B. The register $W'_{j+1}$ stores the sum up to the jth line. $W'_{j+1}$ is updated by the following relation:

$$W'_{j+1} \leftarrow W'_{j+1} + x'_{(1,j+1)} \qquad (24)$$

Similarly, $x'_{(i,j+1)}$ is updated by the following relation:

$$x'_{(1,j+1)} \leftarrow x'_{(1,j)} + W'_{j+1} \qquad (25)$$

The working image $x'_{(i,j)}$ having a sum of pixel values within a triangular area is obtained in this manner.

In the operations for obtaining the image $x'_{(i,j)}$, the number of additions/subtractions for each pixel is about 4 (4 in the normal state; 0 times for the first line; two times when vertical scanning is performed for i=0).

In the second step, as shown in FIG. 16, a sum $y_{(i,j)}$ of the square area (i.e., a diamond-shaped area) inclined at 45 degrees with respect to the transverse or vertical direction is calculated on the basis of the previously obtained working image $x'_{(i,j)}$:

$$y_{(i,j)} \leftarrow x'_{(i,j+L)} + x'_{(i,j-L)} - x'_{(i-L,j)} - x'_{(i+L,j)} \qquad (26)$$

where L is the support size.

The filter having a diamond-shaped impulse response can perform only seven additions/subtractions (including the number of operations in the first step) for each pixel irrespective of the support size.

Figure 1A:
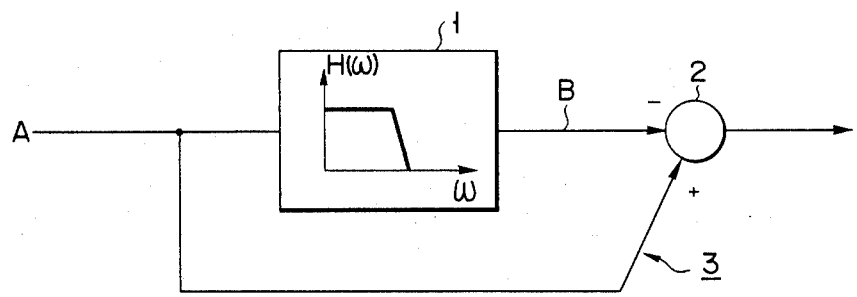
FIGS. 1A and 1B are respectively representations for explaining a method of preparing a high-pass filter from a smoothing filter.
Figure 1B:
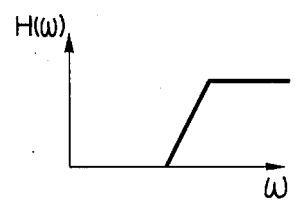
Figure 2A:
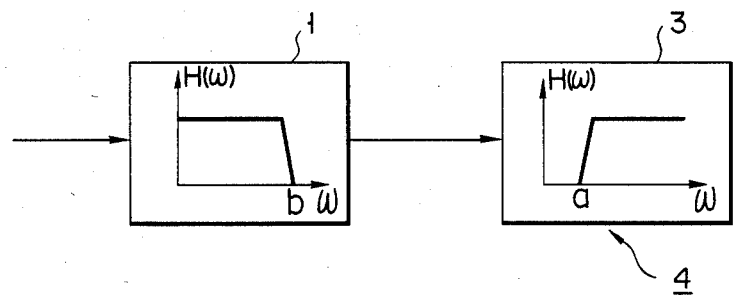
FIGS. 2A and 2B are respectively representations for explaining a method of preparing a band-pass filter from the smoothing and high-pass filters.
Figure 2B:
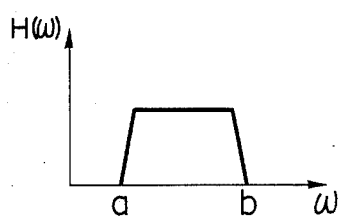
Figure 3A:
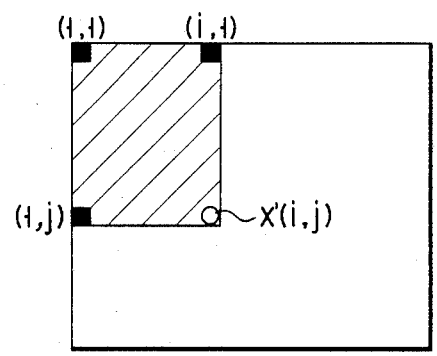
FIGS. 3A to 3C are respectively representations for explaining a conventional uniformly weighting filter algorithm.
Figure 3B:
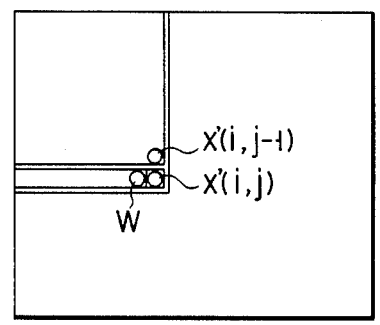
Figure 3C:
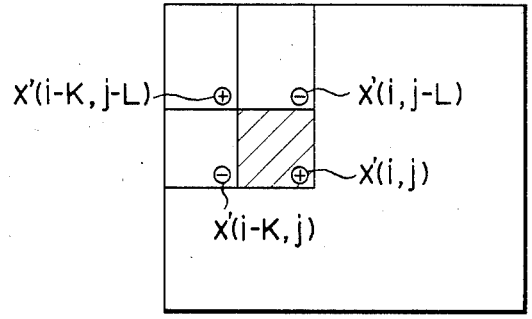

When diamond-shaped impulse response filter and the square-shaped impulse response filter described with reference to FIGS. 3A to 3C are used, a substantially octagonal-shaped impulse response filter can be prepared. More particularly, first, the square-shaped impulse response filter is used for the original image, and the filtered component from this filter is filtered through the diamond-shaped impulse response filter, thereby obtaining the same result when filtered through the octagonal-shaped impulse response filter.

Figure 17:
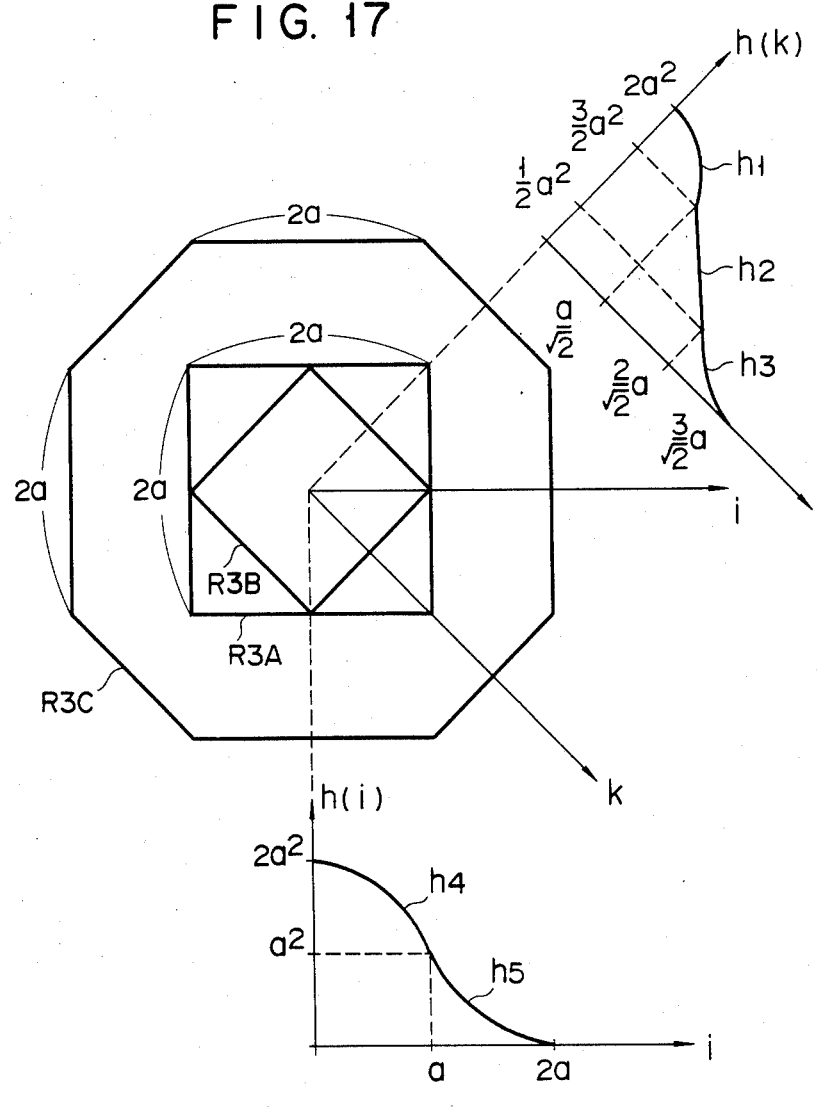

As shown in FIG. 17, the convolution integration of an impulse response 3A of a regular square having a side of 2a and a weighting coefficient of 1 and an impulse response 3B of a diamond inscribing the square is equal to an octagonal-shaped impulse response 3C. The weighting of the octagonal-shaped impulse response is not uniform. Weighting along the oblique direction (e.g., the k direction) of FIG. 17 is a combination of curves h1 to h3, i.e., a combination of quadratic curves and a line. Referring to FIG. 17, the response along the i direction is a combination of curves h4 and h5, i.e., a combination of quadratic curves. The curves h1 to h5 are given by the following functions, respectively:

$$h1 = 2a^2 - k^2 \qquad (27)$$

$$h2 = -\sqrt{ak} + 5a^2/2 \qquad (28)$$

$$h3 = [(3/\sqrt{2})a - k]^2 \qquad (29)$$

$$h4 = 2a^2 - i^2 \qquad (30)$$

$$h5 = (2a - i)^2 \qquad (31)$$

Filtering is performed on the basis of the octagonal-shaped impulse response to improve directivity of the spatial frequency characteristics and decrease the ripple component. In addition, sequential processing is utilized to perform high-speed filtering.

The spatial filter on the basis of the above principle according to the second embodiment will be described.

Figure 18:
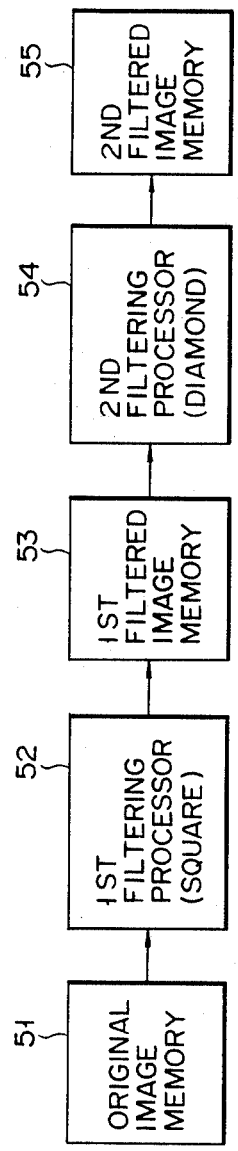
FIG. 18 is a block diagram showing the overall configuration of the spatial filter according to the second embodiment of the present invention.

FIG. 18 is a block diagram of the spatial filter according to the second embodiment of the present invention.

The filtering system comprises an original image memory 51, a first filtering processor 52, a first filtered image memory 53, a second filtering processor 54 and a second filtered image memory 55 which are coupled in cascade. The processor 52 comprises a uniformly weighting filter for receiving an original image read out from the memory 51 and filtering the original image in accordance with the square-shaped impulse response. The image filtered by the processor 52 is temporarily stored in the memory 53. The processor 54 comprises a uniformly weighting filter for receiving the image read out from the memory 53 and filtering the image in accordance with the diamond-shaped impulse response. The image filtered by the processor 54 is stored in the memory 55. The image to be stored in the memory 55 is obtained by filtering the original image in accordance with the octagonal-shaped impulse response.

Figure 19:
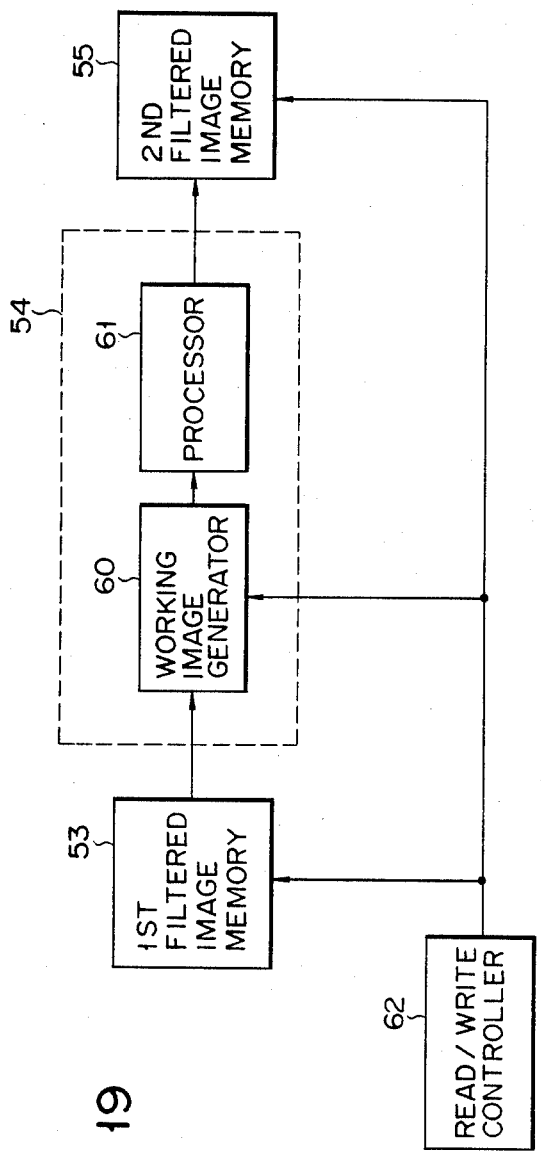
FIGS. 19 to 21 are block diagrams showing the detailed arrangements of parts of the filter shown in FIG. 18, respectively.

The detailed arrangement of the second filtering processor 54 of FIG. 18 is illustrated in FIG. 19.

An image $x_{(i,j)}$ read out from the memory 53 is supplied to a working image generator 60 so as to generate a working image $x'_{(i,j)}$. The image $x'_{(i,j)}$ generated from the generator 60 is processed by a processor 61 in accordance with predetermined processing (to be described later). The resultant image is stored in the memory 55.

Write/read address data is generated from a read-/write controller 62 to access the memory 53, a working image memory (to be described later) in the generator 60 and the memory 55.

Figure 20:
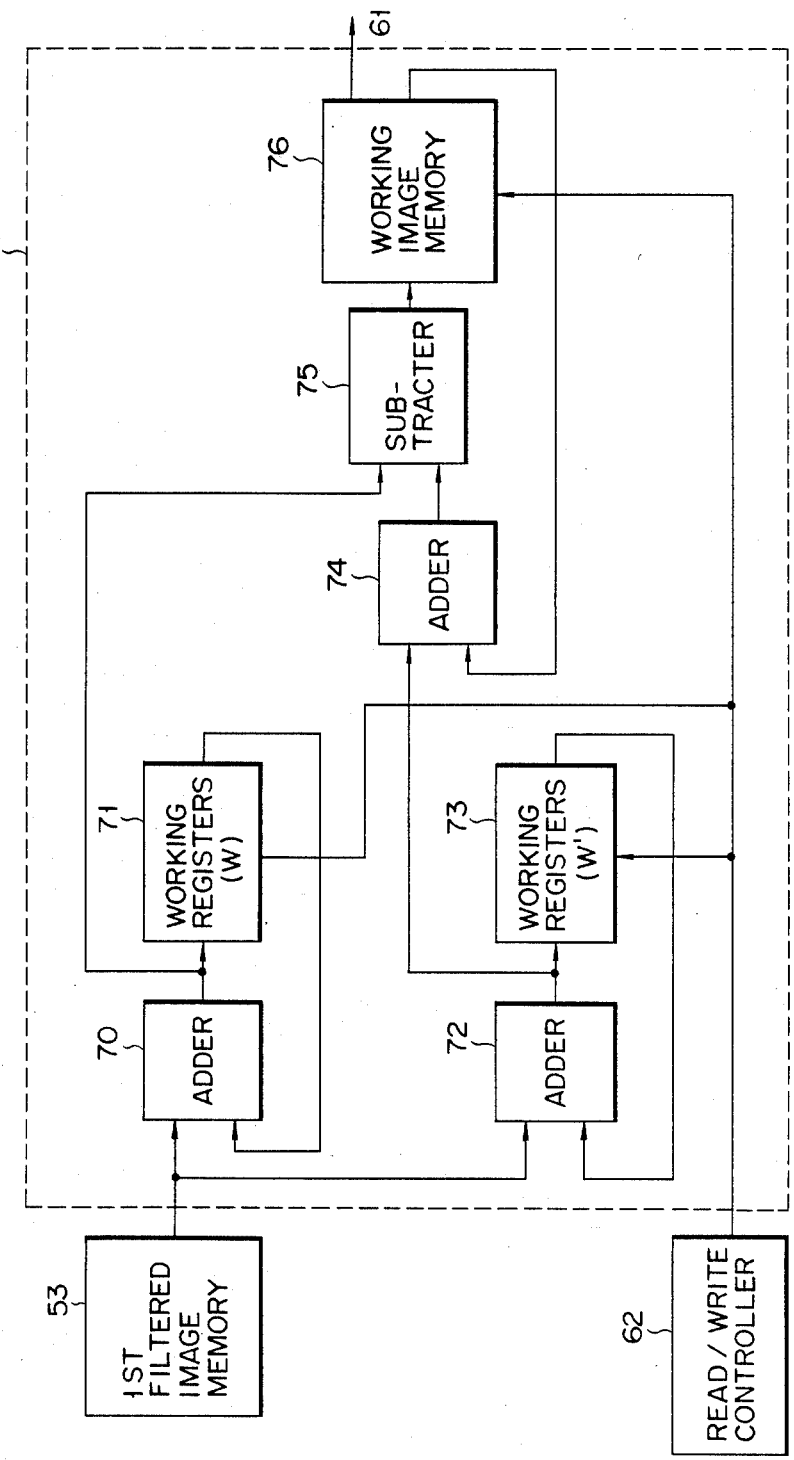

FIG. 20 shows the detailed arrangement of the working image generator 60 shown in FIG. 19.

An adder 70 adds the pixel data $x_{(i,j)}$ read out from the memory 53 and a value $W_{i-j+n}$ (where $i-j+n$ corresponds to the register number) read out from working registers (W) 71. An output from the adder 70 is stored in the registers (W) 71. An adder 72 adds the pixel data $x_{(i+1,j)}$ read out from the memory 53 and a value $W'_{i+j}$ ($i+j$ corresponds to the register number) read out from working registers (W') 73. An output from the adder 72 is stored in the registers (W') 73. The output from the adder 72 is added by an adder 74 to the pixel data $x'_{(i,j)}$ read out from a working image memory 76. A subtracter 75 calculates a difference between the outputs from the adders 70 and 74. An output from the subtracter 75 is stored in the memory 76. The image $x'_{(i,j)}$ as the storage content of the memory 76 is used for processing in the processor 61.

The write/read operation of the registers (W and W') 71 and 73 and the memory 76 is controlled by the controller 62.

Figure 21:
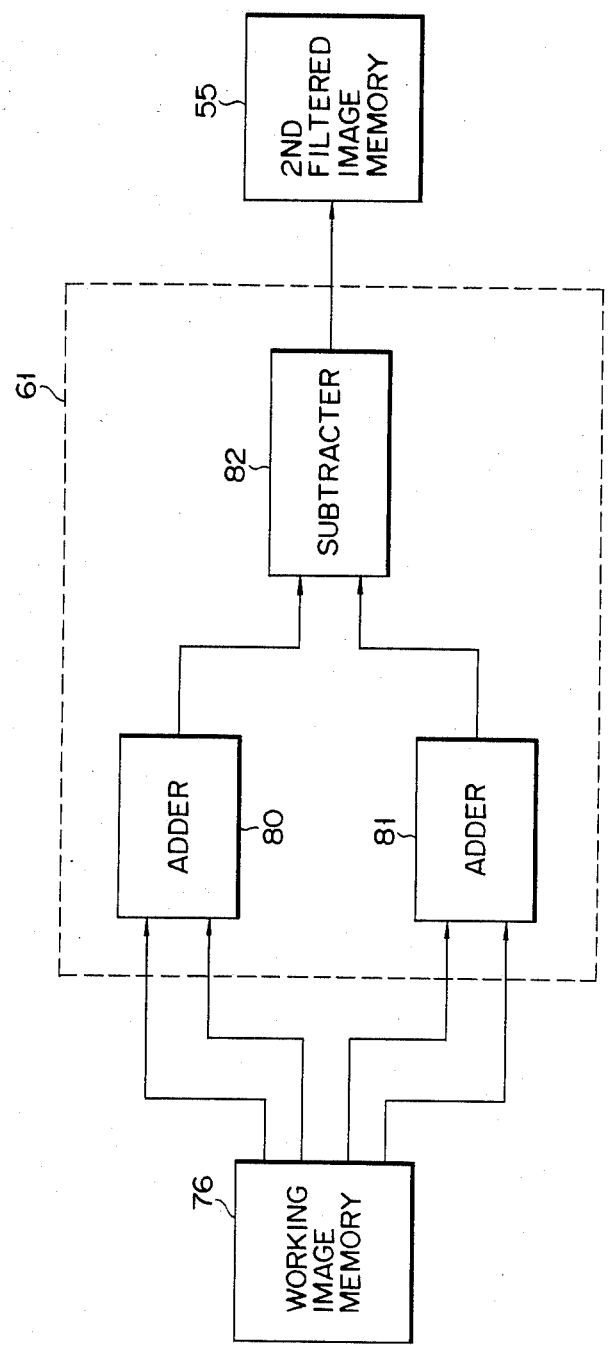

FIG. 21 shows the detailed arrangement of the processor 61 of FIG. 19.

An adder 80 adds the image data $x'_{(i,j+L)}$ and $x'_{(i,j-L)}$ read out from the memory 76. An adder 81 adds image data $x'_{(i-L,j)}$ and $x'_{(i+L,j)}$ read out from the memory 76. A subtracter 82 calculates a difference between the outputs from the adders 80 and 81. An output $y_{(i,j)}$ from the subtracter 82 is stored in the memory 55.

Filtering by the processor 52 as the square-shaped impulse response filter shown in FIG. 18 is performed using a high-speed algorithm described with reference to FIGS. 3A to 3C, and a detailed description thereof will be omitted.

The operation of the second filtering processor 54 as the main part of the system of the second embodiment will be described hereinafter.

In the first step, a working image is generated from the generator 60.

The image data $x_{(i,j)}$ sequentially read out from the memory 53 and the data $W_{i-j+n}$ read out from the registers (W) 71 under the control of the controller 62 are added by the adder 70. A sum from the adder 70 is stored in the same register (of the registers (W) 71 from which the data $W_{i-j+n}$ is read out. In other words, the data $W_{i-j+n}$ is updated to the sum generated from the adder 70 in accordance with equation (21). The image data $x_{(i+1,j)}$ read out from the memory 53 is added by the adder 72 to the data $W'_{i+j}$ read out from the registers (W') 73. A sum from the adder 72 is stored in the same register (W'$_{i+j}$) from which the data W'$_{i+j}$ is read out. The data W'$_{i+j}$ is updated to the sum generated from the adder 72 in accordance with equation (22). The output from the adder 72 is added by the adder 74 to the pixel data $x'_{(i,j)}$ read out from the memory 76. The output $x'_{(i+1,j)}$ from the subtracter 75 is the same as the value given by equation (23), and the data $x'_{(i+1,j)}$ is stored at address (i+1,j) of the memory 76. The above operation is performed in the transverse direction of the image, i.e., in a direction along which the parameter i is increased.

Vertical scanning, i.e., scanning in a direction along which the parameter j is increased can be performed in the same manner as described above. As described with reference to FIGS. 15A and 15B, when one-line scanning is completed, the data up to the jth line is stored in each of the registers (W) 71 and (W') 73. The data of the next vertical line (i.e., the (j+1)th line) is updated using the data W'$_{j+1}$ read out from the registers (W') 73 in accordance with equation (24). The data $x'_{(1,j+1)}$ is updated in accordance with equation (25).

In this manner, the working image $x_{(i,j)}$ is prepared in the memory 76.

The number of operations per pixel for preparing the image $x'_{(i,j)}$ in the first step is 4 in the normal state (once in each of the adders 70, 72 and 74 and the subtracter 75).

In the second step, the sum y of the diamond-shaped area in FIG. 16 is calculated by the processor 61 on the basis of the working image prepared in the first step.

The pixel data $x'_{(i,j+L)}$ and $x'_{(i,j-L)}$ read out from different addresses of the memory 76 are added by the adder 80. Similarly, the pixel data $x_{(i-L,j)}$ and $x'_{(i+L,j)}$ read out from the memory 76 are added by the adder 81. A difference between the outputs from the adders 80 and 81 is calculated by the subtracter 82. The above operation corresponds to performance of equation (26). The ouput $y_{(i,j)}$ from the subtracter 82 is stored as the filtered result in the memory 55 on the basis of the diamond-shaped impulse response.

The number of operations per pixel for calculating the sum $y_{(i,j)}$ in the diamond-shaped area in the second step is 3 (i.e., once in each of the adders 80 and 81 and the subtracter 82). Therefore, the number of operations in filtering on the basis of the diamond-shaped impulse response is 7 (4 in the first step and 3 in the second step) irrespective of the support size, thereby achieving high-speed processing.

When the diamond-shaped impulse response filter is used, high-speed filtering using the octagonal-shaped impulse response becomes possible as described with reference to FIG. 17. After the original image is filtered by the processor 52 as the square-shaped impulse response filter, the image from the processor 52 is filtered by the processor 54 as the diamond-shaped impulse response filter. The square-shaped impulse response filter can be coupled in cascade with the output of the diamond-shaped impulse response filter to obtain the same effect as in the above embodiment. Part of the spatial filter of the second embodiment can be replaced with an equivalent or compatible means.

The total number of operations per pixel in the second embodiment is 11 (i.e., 4+7), thus providing high-speed operation.

A spatial filter according to a third embodiment of the present invention will be described hereinafter. Although the same mathematical notations as in the first and second embodiments are used in the third embodiment, these do not always have the same meaning as in the first and second embodiments.

The principle as the characteristic part of the third embodiment will be described.

Figure 22:
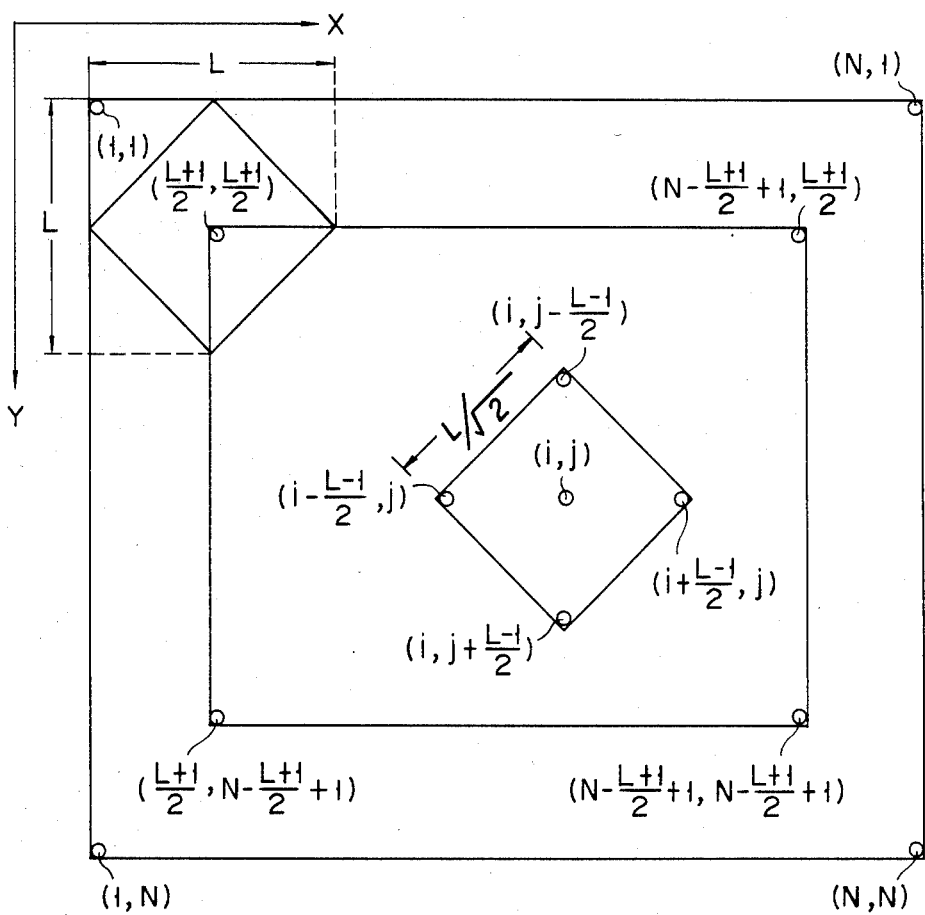

As shown in FIG. 22, the original image has a size of N×N which constitutes a square area given as follows:

$$(1,1) \quad \ldots \quad (N,1)$$
$$\vdots \quad \quad \vdots$$
$$(1,N) \quad \ldots \quad (N,N)$$

Assume that the impulse response has a diamond shape with a size of L×L, where L is an odd number (although the number can be an even number to obtain the same effect as in the case of the odd number), and that the output image, i.e., the processed image is plotted on the same coordinate system as in that of the original image. The range of the image data of the output image is represented as follows:

$$([L + 1]/2, [L + 1]/2) \quad \ldots \quad (N - \{[L + 1]/2\} + 1, [L + 1]/2)$$
$$\vdots \quad \quad \vdots$$
$$([L + 1]/2, N - \{[L + 1]/2\} + 1) \quad \ldots \quad (N - \{[L + 1]/2\} + 1, \{N - [L + 1]/2\} + 1)$$

This is because accurate filtering cannot be performed outside this range.

Filtering by diamond-shaped impulse responses all of which have weighting coefficients of 1 is calculation of a sum of pixel data within the diamond-shaped areas. The diamond-shaped impulse response filter in the embodiment sequentially processes the sum of the pixel data within the diamond-shaped area in accordance with sequential processing.

This sequential processing technique will be described in more detail.

Figure 23B:
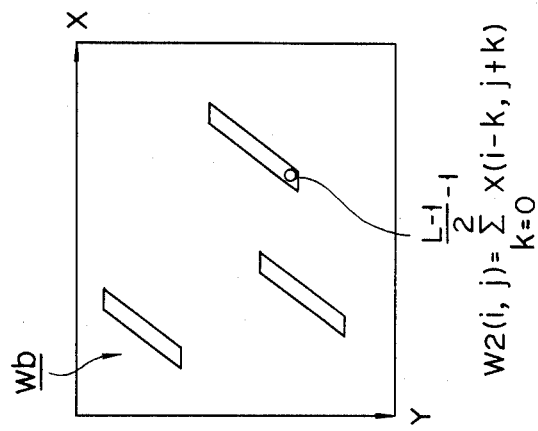
Figure 23A:
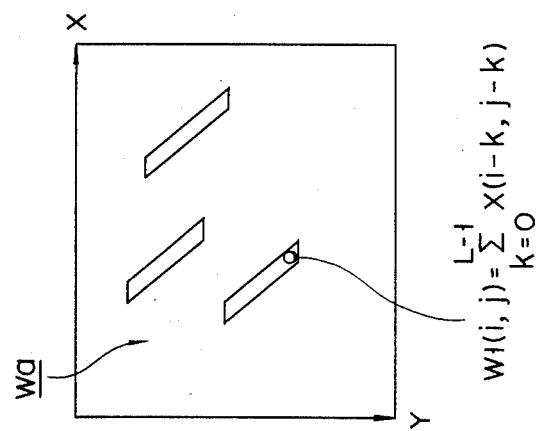

Working image memories W1 and W2 are prepared. Sums of pixels in oblique line regions (Wa and Wb) having a length of $1/\sqrt{2}$ times the support size L, as shown in FIGS. 23A and 23B, are stored in the memories W1 and W2, respectively. Processing is performed using the data stored in the memories W1 and W2. For example, a sum $W1_{(i,j)}$ corresponding to a pixel $x_{(i,j)}$ using the memory W1 can be obtained by using the sum $W1_{(i-1,j-1)}$ immediately preceding the sum W1(i,j), which corresponds to the pixel $x_{(i-1,j-1)}$ as follows:

$$W1_{(i,j)} = W1_{(i-1,j-1)} + x_{(i,j)} - x_{[i-\{(L-1)/2\}-1,j-\{(L-1)/2\}-1]} \quad (41)$$

The sum corresponding to the upper left pixel is used to access the memory W2 as follows:

$$W2_{(i,j)} = W2_{(i-1,j-1)} + x_{(i,j)} - x_{[i+\{(L-1)/2\},j-\{(L-1)/2\}]} \quad (42)$$

A sum y of the pixels in the diamond-shaped area is calculated using the data stored in the memories W1 and W2. Assume that a solid diamond-shaped area represents a sum $y_{(i,j)}$ to be obtained. This sum $y_{(i,j)}$ is obtained by using the sum $y_{(i-1,j)}$ immediately to the left of the sum to be calculated, i.e., by transverse scanning in the following manner:

$$y_{(i,j)} = y_{(i-1,j)} + W1_{(i+\{[L-1]/2,j)} + \quad (43)$$
$$W2_{(i,j+\{[L-1]/2\})} - W1_{(i-1,j+\{[L-1]/2\})} -$$
$$W2_{(i-\{(L-1)/2\},j-1)}$$

Figure 24A:
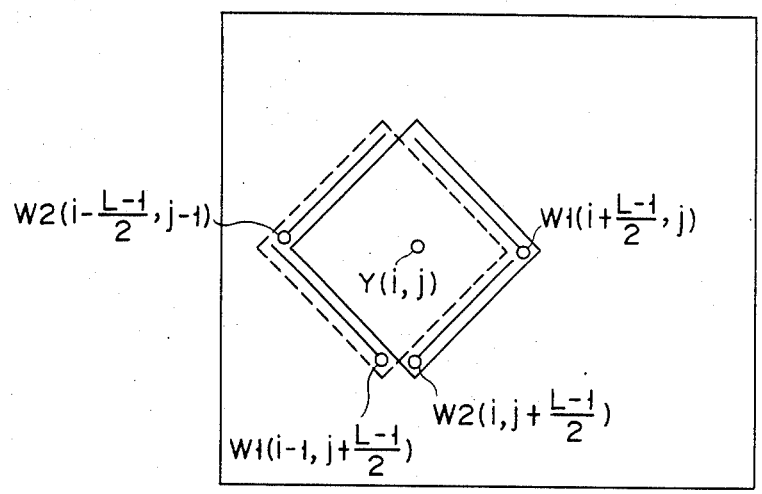
Figure 24B:
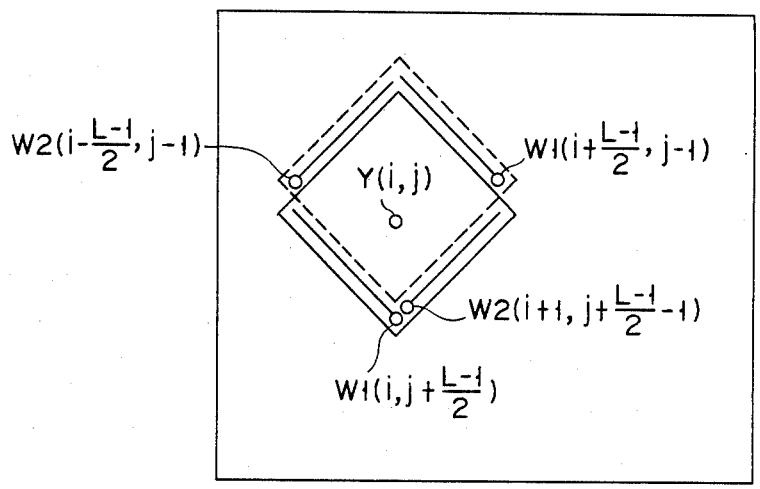

When a solid line area in FIG. 24 represents a sum $y_{(i,j)}$ to be calculated, the sum represented by the dotted area (corresponding to vertical scanning) is utilized to obtain the sum $y_{(i,j)}$.

The total number of operations for one pixel throughout the process is 8, and high-speed filtering using the diamond-shaped impulse response can be achieved. It should be noted that the number of operations is independent of the support size.

The octagonal-shaped impulse response filter can be obtained by using the diamond-shaped impulse resonse filter thus obtained and the square-shaped impulse response filter described with reference to FIGS. 3A to 3C in the same manner as in the second embodiment. When filtering is performed using the octagonal-shaped impulse response, the directivity of the spatial frequency characteristics can be improved and the ripple component can be decreased.

FIG. 25 is a block diagram showing a diamond-shaped spatial filter based on the above principle according to the third embodiment of the present invention.

An original image to be filtered is stored in an original image memory 91. Working image generator 92 and 93 generate working images by using the original image data read out from the memory 91. The generators 92 and 93 have memories W1 and W2, respectively, and will be described later. A processor 94 has a plurality of adders and a subtracter and adds and subtracts the working images generated from the generators 92 and 93. The processor 94 will also be described later. A memory 95 stores an image generated from the processor 94. The read/write addresses are controlled by a read/write controller 96 to access the memory 91, the memories W1 and W2 in the generators 92 and 93, and the memory 95.

Figure 26:
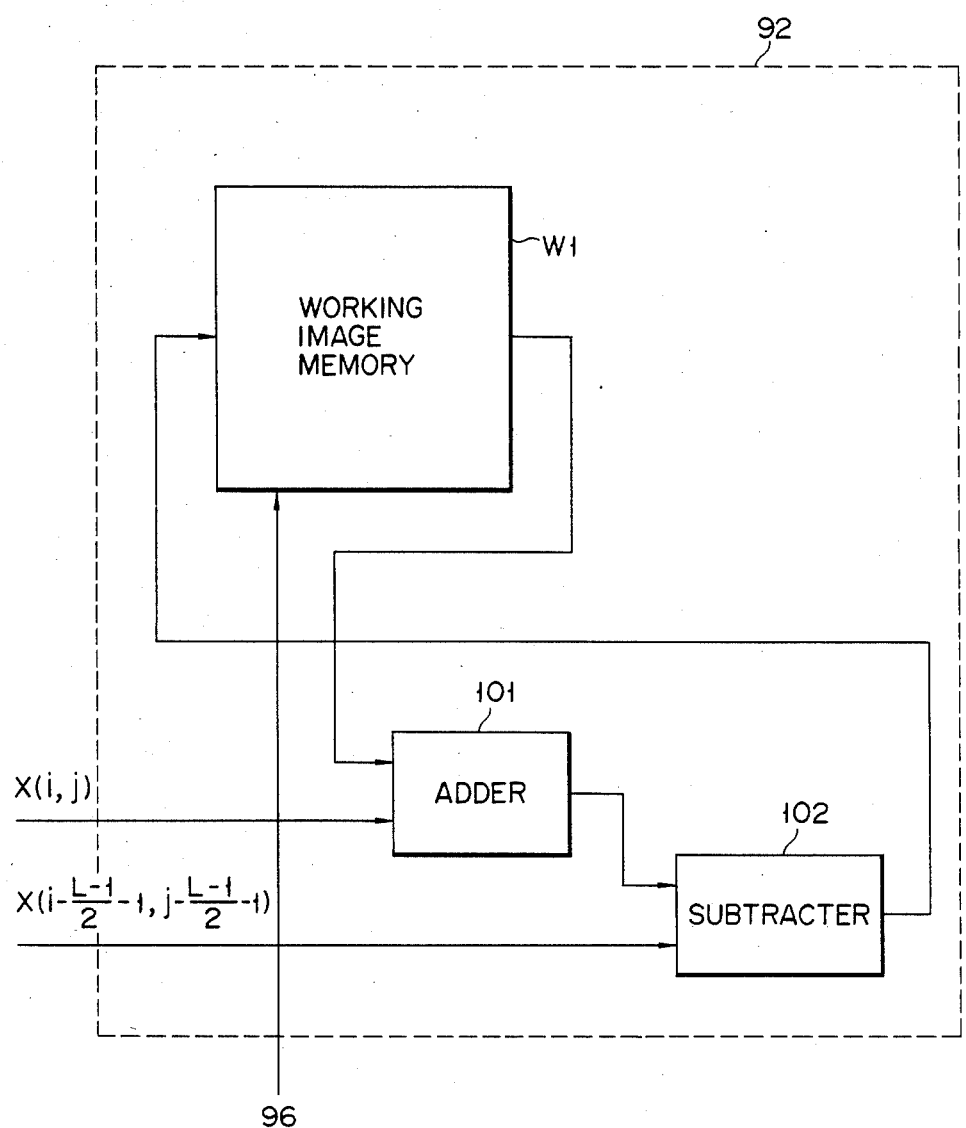

FIG. 26 shows the detailed arrangement of the generator 92 shown in FIG. 25.

An adder 101 adds the pixel data $x_{(i,j)}$ read out from the memory 91 and a sum $W1_{(i-1,j-1)}$ which is the sum up to the immediately preceding line and column of the data $x_{(i,j)}$ and which is already stored in the memory W1. A subtracter 102 calculates a difference between the sum from the adder 101 and pixel data given below and read out from the memory 91:

$$x_{(i-\{[L-1]/2\}-1, j-\{[L-1]/2\}-1)}$$

An output, i.e., $W1_{(i,j)}$ derived from equation (41), from the subtracter 102 is stored in the memory W1.

The generator 93 having the memory W2 has substantially the same arrangement as in the generator 92 shown in FIG. 26, and a detailed description thereof will be omitted.

FIG. 27 shows the detailed arrangement of the processor 94 of FIG. 25.

An adder 111 adds working image data W1O and W2P generated from the generators 92 and 93. An adder 112 adds working image data W1Q and W2R generated from the generators 92 and 93. A subtracter 113 calculates a difference between the sum generated from the adder 112 and data YS (i.e., the immediately preceding sum of an adder 114) already stored in the memory 95. The adder 114 adds the outputs from the adder 111 and the subtracter 113. The data W1O, W2P, W1Q, W2R and YS upon vertical scanning of the original image differ from those upon transverse scanning thereof. These data are given as follows when transverse scanning is performed:

$$W1O = W1_{(i+\{[L-1]/2\}, j)} \quad (44)$$

$$W2P = W2_{(i,j+\{[L-1]/2\})} \quad (45)$$

$$W1Q = W1_{(i-1, j+\{[L-1]/2\})} \quad (46)$$

$$W2R = W2_{(i-\{[L-1]/2\}, j-1)} \quad (47)$$

$$YS = y_{(i-1,j)} \quad (48)$$

The above data are given as follows when vertical scanning is performed:

$$W1O = W1_{(i, j+\{[L-1]/2\})} \quad (49)$$

$$W2P = W2_{(i+1, j+\{[L-1]/2\}-1)} \quad (50)$$

$$W1Q = W1_{(1+\{[L-1]/2\}, j-1)} \quad (51)$$

$$W2R = W2_{(i-\{[L-1]/2\}, j-1)} \quad (52)$$

$$YS = y_{(i,j-1)} \quad (53)$$

The sum $y_{(i,j)}$ from the adder 114 is stored in the memory 95.

Processing in the diamond-shaped spatial filter will be described. Assume that the uppermost left pixel data as the initial value of the output image is given by a known direct calculation as follows:

$$y_{([L+1]/2, [L+1]/2)}$$

Figure 28A:
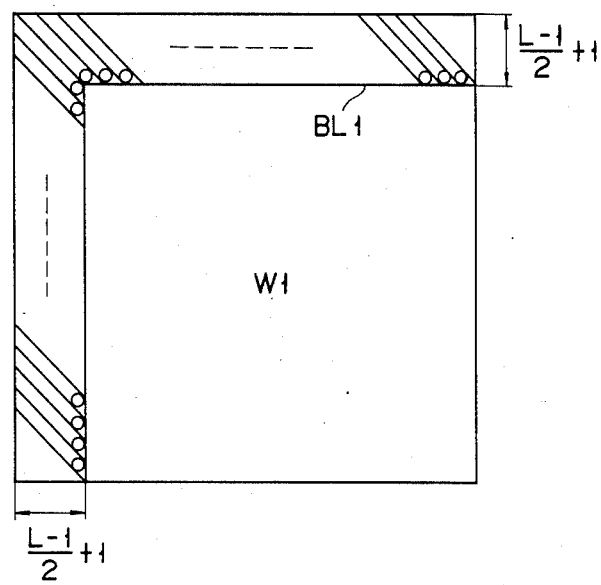
FIGS. 28A and 28B are respectively representations for explaining the effect of the spatial filter shown in FIG. 25.
Figure 28B:
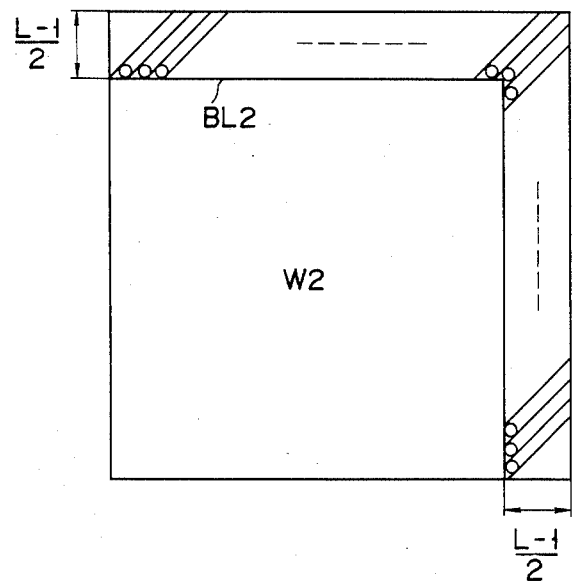

The data of pixels on boundaries BL1 and BL2 are calculated by a known direct calculation, as shown in FIGS. 28A and 28B, and are stored in the memories W1 and W2, respectively.

In the first step, working images are generated by the generators 92 and 93, respectively. When data $W1_{(i,j)}$ is to be generated by the generator 92, the controller 96 accesses the memory 91 to read out the data $x_{(i,j)}$ and $x_{(i-\{[L-1]/2\}-1, j-\{[L-1]/2\}-1)}$ from the memory 91. These data are supplied to the adder 101 and the subtracter 102. The pixel data $W1_{(1-1, j-1)}$ is read out from the memory W1 and supplied to the adder 101. The sum generated from the adder 101 is supplied to the subtracter 102. The subtracter 102 performs a subtraction in accordance with equation (41). The subtracted result is stored in the memory W1. One-pixel data of the working image is obtained, and the above operation is repeated to prepare the working image in the memory W1.

The same operation as described above is performed in the generator 93 to obtain $W2_{(i,j)}$ in accordance with equation (42), thereby storing the working image in the memory W2.

In the second step, the transverse one-line filtered image (see FIG. 24A) is calculated by the processor 94 on the basis of the working image generated in the first step.

Assume that the operation up to $y_{(i-1,j)}$ is completed. In order to obtain $y_{(i,j)}$, the data W1O and W2P and the data W1Q and W2R are supplied to the adders 111 and 112 in the processor 94, respectively. The data W1O, W2P, W1Q and W2R are read out from the memories W1 and W2, and are given by equations (44) to (47). The adder 111 adds the data W1O and W2P, and the adder adds the data W1Q and W2R. The sum from the adder 112 is subtracted by the subtracter 113 from the data YS (i.e., $y_{(i-1,j)}$ in this case) already stored in the memory 95. A subtracted result from the subtracter 113 is added by the adder 114 to the sum generated from the adder 111. In other words, the operation is performed in accordance with equation (43). The data $y_{(i,j)}$ as a sum from the adder 114 is stored in the memory 95, thus obtaining one-pixel data. When the above operation is repeated transversely (along a direction where the parameter i is increased, one-line processing is completed.

After the transverse one-line filtered image is obtained in the second step, a vertical one-line filtered image is generated from the processor 94 in the third step.

The operation of the processor 94 in the third step is the same as that of the second step, except for the address control by the controller 96. More particularly, in the third step, the data W1O, W2P, W1Q, W2R and YS correspond to the values derived by equations (49) to (53). Therefore, the output from the adder 114 is given as follows:

$$y_{(i,j)} = y_{(i,j-1)} + W1_{(i,j+\{(L-1)/2\})} + \quad (54)$$

$$W2_{(i+1,\{(L-1)/2\}-1)} - W1_{(i+\{(L-1)/2\},j-1)} -$$

$$W2_{(i-\{(L-1)/2\},j-1)}$$

and is stored in the memory 95.

The third and second steps are alternately performed to complete filtering of the entire image.

The octagonal-shaped impulse response filter is constituted by using the diamond-shaped impulse response filter in the same manner as in the second embodiment.

A bit length of the working image in the third embodiment is given in the order of $$a + \text{Log}_2 \{(L-1)/2\}[\text{bit}] \quad 30$$

where a is a bit length of the original image and L is a support size. When the 2,000×2,000 10-bit original image is filtered on the order of L=65, each of the memories W1 and W2 need have a capacity of only 14 bits.

Figure 29B:
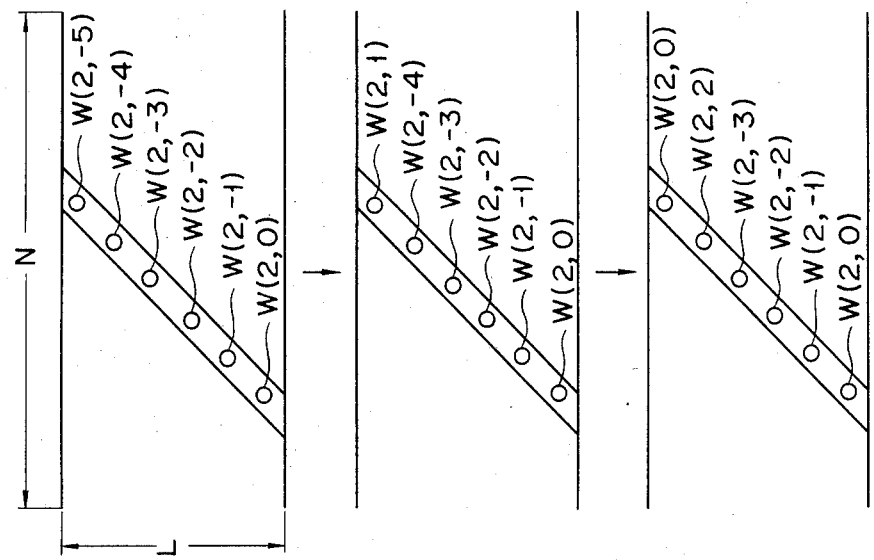
Figure 29A:
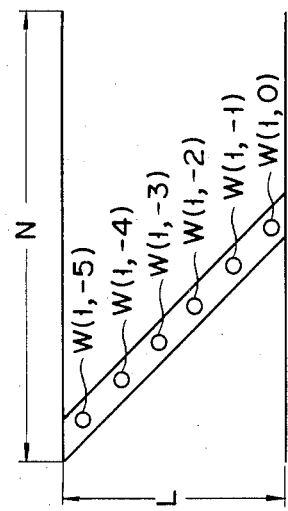

Each of the working images stored in the memories W1 and W2 must have the same number of pixels (N×N) as that of the original image. However, the working image can have a size of N×L. As shown in FIG. 29A and 29B, the working image can be recursively used by recursively controlling the address access of the memories W1 and W2.

As shown in FIG. 30, working image memories W1, W1', W2 and W2' each having a two-line capacity are prepared so as to correspond to four lines of the diamond-shaped impulse response. Data $W1_{(i,0)}$ and $W1_{(i-1,-1)}$, data $W1'_{(i,0)}$ and $W1'_{(i-1,-1)}$, data $W2_{(i,0)}$ and $W2_{(i+1,-1)}$ and data $W2'_{(i,0)}$ and $W2'_{(i+1,-1)}$ are stored in the memories W1, W1', W2 and W'2, respectively. Since the data $W1_{(i,0)}$ can be calculated by the immediately preceding line value $W1_{(i-1,j-1)}$ and the original image, each working image memory need only have a two-line memory capacity. With the above arrangement, the number of pixels in the working image can be decreased, thereby decreasing load on hardware. It should be noted that the working image generation is simultaneously performed with filtered image generation.

The respective embodiments of the present invention can be achieved by computer software. When software is used, the blocks in the block diagrams are replaced with software modules or subroutines. These software modules and subroutines can be easily provided by a known software technique. Furthermore, part or all of the processing of the present invention can be realized by hardware using logic elements. In this case, programmable elements such as a logic array and an array processor can be effectively used in the main part of the hardware.

What is claimed is:

1. A spatial filter, for filtering image data of an original image stored in an original image memory, comprising:

a. square-shaped impulse response filter means coupled to the original image memory having a square-shaped impulse response defined by a first pair of sides and a second pair of sides, said pairs of sides being parallel to a horizontal axis and a vertical axis of said original image, respectively, said square-shaped impulse response filter means being adapted for generating, as pixel data of a selected pixel of said original image, a sum of pixel data for pixels in a square area proximal to said selected pixel; and b. diamond-shaped impulse response filter means coupled in cascade with said square-shaped impulse response filter means and having a diamond-shaped impulse response defined by a first and a second pair of sides, each said pair respectively being inclined at an angle of 45 degrees to both said horizontal and vertical axes of said original image, said pairs of sides being perpendicular to each other, said diamond-shaped impulse response filter means being adapted for generating, as pixel data of said selected pixel of said original image, a sum of pixel data for pixels in a square area proximal to said selected pixel, wherein said diamond-shaped impulse response filter means comprises:

(i) a plurality of working registers for storing sums of pixel data for pixels within a region of said original image between a first line and a second line, said first and second lines being inclined at angles of 45 degrees with respect to said vertical axis of said original image, said first and second lines also being perpendicular to each other and symmetrical about a vertical line;

(ii) a working image memory for storing, as pixel data of any given pixel, a sum of pixel data for pixels of said original image for a region between said first and second lines, wherein said first and second lines include said given pixel, said stored pixel data for given pixels representing a working image;

(iii) an adder for adding said pixel data of said selected pixel of said original image to said pixel data stored in said plurality of working registers; and (iv) processing means coupled between said adder and said working image memory for performing addition and subtraction utilizing said pixel data stored in said working image memory for four given pixels which comprise vertices of a square area with sides inclined at an angle of 45 degrees to a vertical axis of said working image and pixel data from said adder to obtain pixel data for storage in said working image memory.

2. A spatial filter, for filtering image data of an original image stored in an original image memory, comprising:

a. square-shaped impulse response filter means coupled to said original image memory having a square-shaped impulse response defined by a first pair of sides and a second pair of sides, said pairs of sides being parallel to a horizontal axis and a vertical axis of an original image, respectively, said square-shaped impulse response filter means being adapted for generating, as pixel data of a selected pixel of said original image, a sum of pixel data for pixels in a square area proximal to said selected pixel; and b. diamond-shaped impulse response filter means coupled in cascade with said square-shaped impulse response filter means and having a diamond-shaped impulse response defined by a first and a second pair of sides, each said pair respectively being inclined at an angle of 45 degrees to both said horizontal and vertical axes of said original image, said pairs of sides being perpendicular to each other, said diamond-shaped impulse response filter means being adapted for generating, as pixel data of said selected pixel of said original image, a sum of pixel data for pixels in a square area proximal to said selected pixel, wherein said diamond-shaped impulse response filter means comprises:

(i) a first working image generating means comprising:

a first working image memory for storing sums of pixel data for pixels in a first area, said sums of pixel data being generated for one-dimensional lines of pixels within said first area, wherein said lines of pixels are inclined at an angle of 45 degrees with respect to said vertical axis of said original image and corresponds to a length of $1/\sqrt{2}$ times a preselected support size;

a first adder for adding said sums stored in said first working image memory and pixel data for pixels of said original image to provide an output of said first working image generating means;

a first subtracter for calculating a difference between said sums from said first adder and said pixel data for pixels of said original image to provide an output of said first working image generating means; and (ii) a second working image generating means comprising:

a second working image memory for storing sums of pixel data for pixels in a second area, said sums of pixel data being generated for one-dimensional lines of pixels within said second area, wherein said lines of pixels are inclined perpendicular to said lines of pixels for said first area and corresponds to a length of $1/\sqrt{2}$ times said preselected support size;

a second adder for adding the sum stored in said second working image memory and pixel data for pixels of said original image; and a second subtracter for calculating a difference between said sums from said second adder and pixel data of said original image to provide an output of said second working image generating means;

(iii) a filtered image memory for storing said sums of said pixel data of said first and second adders;

(iv) processing means for performing addition and subtraction utilizing sums stored in said filtered image memory and said outputs from said first and second working image generating means to obtain a sum of pixel data for pixels in an area defined by said diamond-shaped response, said sum being stored in said filtered image memory; and (v) read/write control means for controlling read/write access of said first and second working image memories and said filtered image memory.

3. A spatial filter for filtering image data of an original image stored in an original image memory comprising:

a plurality of spatial filters coupled to said original image memory, each providing uniformly weighted square-shaped impulse responses for generating, as pixel data of a selected pixel of said original image, a sum of pixel data for pixels in a predetermined rectangular area proximal to said selected pixel;

coupling means for coupling said plurality of spatial filters together to provide substantially circular filter characteristics;

a plurality of working registers coupled to said original image memory for storing sums of pixel data for pixels of said original image along a first line and a second line of pixels of said original image which are respectively parallel to a horizontal axis and a vertical axis of said orignal image;

a working image memory coupled to said plurality of working registers for storing, as pixel data of a given pixel, a sum of pixel data for pixels of said original image within a region of said original image bordered by the said first and second lines, both said first and second lines including said given pixel;

an adder for adding said pixel data for pixels of said original image to said data stored in said working registers; and processing means for performing addition and subtraction utilizing pixel data of pixels representing four vertices of a square area having a first and a second pair of sides which are parallel to said horizontal and vertical axes of said working image, respectively.

* * * * *